(12) United States Patent
Malone et al.

(10) Patent No.: US 11,938,422 B2
(45) Date of Patent: Mar. 26, 2024

(54) DIFFERENTIAL PRESSURE BASED AUTOMATED SAND DETECTION AND HANDLING SYSTEM FOR OIL AND GAS WELL OPERATIONS

(71) Applicant: FMC Technologies, Inc., Houston, TX (US)

(72) Inventors: Ryan Malone, Farmington, NM (US); Sander Baaren, Houston, TX (US); Eric Rasmussen, Austin, TX (US); Richard Minter, Sealy, TX (US)

(73) Assignee: FMC Technologies, Inc., Houston, TX (US)

( * ) Notice: Subject to any disclaimer, the term of this patent is extended or adjusted under 35 U.S.C. 154(b) by 923 days.

(21) Appl. No.: 16/835,537

(22) Filed: Mar. 31, 2020

(65) Prior Publication Data

US 2021/0299595 A1    Sep. 30, 2021

(51) Int. Cl.
| | |
|---|---|
| *B01D 21/24* | (2006.01) |
| *B01D 21/26* | (2006.01) |
| *B01D 21/30* | (2006.01) |
| *B01D 21/32* | (2006.01) |
| *B01D 21/34* | (2006.01) |
| *B04C 5/00* | (2006.01) |
| *E21B 43/26* | (2006.01) |

(52) U.S. Cl.
CPC .......... *B01D 21/32* (2013.01); *B01D 21/245* (2013.01); *B01D 21/267* (2013.01); *B01D 21/302* (2013.01); *B01D 21/34* (2013.01); *B04C 5/00* (2013.01); *E21B 43/2607* (2020.05)

(58) Field of Classification Search
CPC ...... B01D 21/245; B01D 21/32; B01D 21/34; G01F 23/0007
See application file for complete search history.

(56) References Cited

U.S. PATENT DOCUMENTS

| | | | |
|---|---|---|---|
| 3,818,333 A | 6/1974 | Walker | |
| 6,032,539 A | 3/2000 | Liu et al. | |
| (Continued) | | | |

FOREIGN PATENT DOCUMENTS

| | | |
|---|---|---|
| CA | 1201789 A | 3/1986 |
| CN | 201281643 Y | 7/2009 |
| (Continued) | | |

OTHER PUBLICATIONS

Baaren, Sander et al. "Optimizing Automated Well Testing for the Unconventional Oil Field using a Modular Approach" SPE-197826-MS, Nov. 11, 2019, pp. 1-12 (12 pages).

(Continued)

*Primary Examiner* — Bradley R Spies
(74) *Attorney, Agent, or Firm* — Osha Bergman Watanabe & Burton LLP

(57) ABSTRACT

One illustrative system disclosed herein includes a separator vessel that is adapted to separate solids particles from a flow of a multi-phase fluid, a differential pressure sensing system that is adapted to measure a differential pressure of a column of the multi-phase fluid in the separator vessel and a control system that is adapted to determine at least one of a level, volume or weight of the separated solids particles within the separator vessel based upon at least the measured differential pressure of the column of the multi-phase fluid in the separator vessel.

21 Claims, 20 Drawing Sheets

(56) References Cited

U.S. PATENT DOCUMENTS

| | | | |
|---|---|---|---|
| 6,035,952 | A | 3/2000 | Bradfield et al. |
| 6,672,335 | B1 | 1/2004 | Welborn |
| 6,790,367 | B2 | 9/2004 | Schmigel et al. |
| 2004/0020860 | A1* | 2/2004 | Schmigel ............... B01D 21/32 210/744 |
| 2014/0345727 | A1 | 11/2014 | Gilmore et al. |
| 2018/0333657 | A1 | 11/2018 | Lyon |
| 2019/0388907 | A1* | 12/2019 | Bowley ................... B04C 5/103 |
| 2021/0299595 | A1 | 9/2021 | Malone et al. |

FOREIGN PATENT DOCUMENTS

| | | | |
|---|---|---|---|
| WO | 2014/0179050 A1 | 11/2014 | |
| WO | WO-2018160927 A1 * | 9/2018 | ............. G01F 1/712 |
| WO | 2018236402 A1 | 12/2018 | |
| WO | WO-2019200311 A1 * | 10/2019 | ........... B01D 21/245 |
| WO | 2019241326 A1 | 12/2019 | |
| WO | 2021202534 A1 | 10/2021 | |

OTHER PUBLICATIONS

International Search Report issued in International Application No. PCT/US2021/024894 dated Jul. 5, 2021 (6 pages).
Written Opinion issued in International Application No. PCT/US2021/024894 dated Jul. 5, 2021 (7 pages).
Office Action issued in Canadian Application No. 3,173,237, dated Jan. 16, 2024 (3 pages).

* cited by examiner

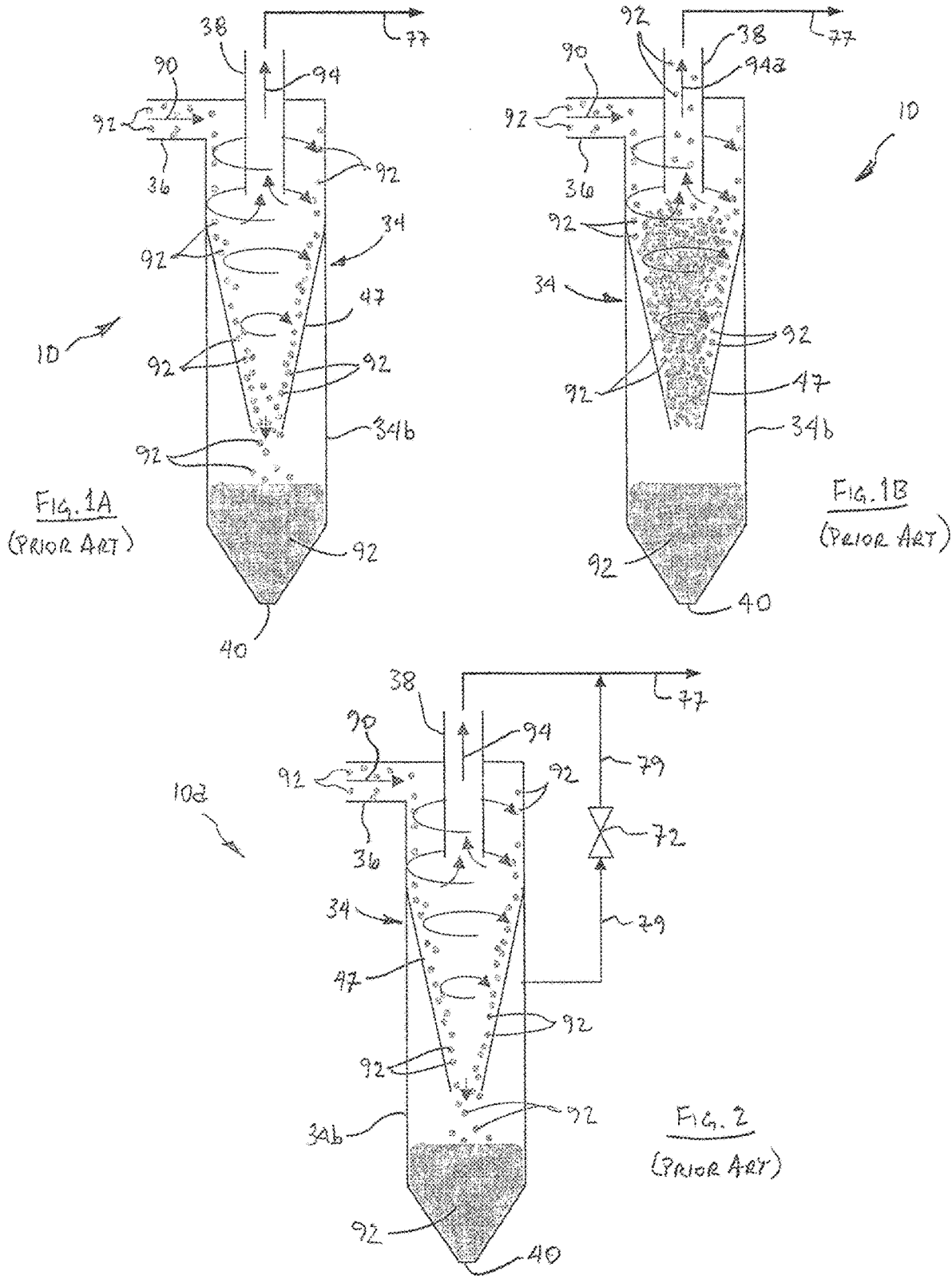

DIFFERENTIAL PRESSURE BASED AUTOMATED SAND DETECTION AND HANDLING SYSTEM FOR OIL AND GAS WELL OPERATIONS

BACKGROUND

1. Field of the Disclosure

Generally, the present disclosure relates to systems and methods for handling multi-phase fluids that are returned from a wellbore during oil and gas well operations, and in particular to differential pressure based automated detection and handling of particulate material such as sand that is separated from the returned multi-phase fluid.

2. Description of the Related Art

During a hydraulic fracturing operation of an oil and gas well—generally referred to herein as a "Tracking operation"—oil and/or gas production from a formation is stimulated by injecting large quantities of fracking fluid into the drilled wellbore under high pressure, thus creating cracks in the targeted formation that allow natural gas, petroleum hydrocarbons, and brine or produced water to more freely flow through the formation to the wellbore. Generally, fracking fluid consists of approximately 90% water by volume and approximately 9.5% suspended sand and/or other proppant materials that are forced into and hold open the cracks that are created during the fracking operation. The remaining 0.5% of the fracking fluid is typically a mixture of chemical additives that serve a variety of specific purposes, and often include acids for dissolving parts of the rock to initiate cracking, corrosion inhibitors, lubricating and gelling agents, antimicrobial chemicals, etc.

After completion of the fracking operation, a flowback operation is performed during which time fluid is allowed to flow from the well and is returned to the wellhead at the surface as a multi-phase effluent containing suspended solids and pressurized liquids and/or gases. For example, the returned multi-phase fluid may include produced water from the formation, some amount of liquid and/or gaseous hydrocarbons, and at least a portion of the fracking fluid that was injected during the fracking operation, including a portion of the injected sand and/or other proppants. At the surface, this multi-phase fluid is typically processed using specialized equipment that is configured to separate and treat the constituent components of the fluid while preventing the release of any potentially hazardous materials into the environment surrounding the well, and also to determine the volumetric rate of the returned solids, i.e., the sand and/or other proppants.

As may be appreciated, the sand/proppant that is present in the multi-phase effluent can cause significant erosion to the equipment, valves, and piping through which the fluid is transported, particularly in systems having high volumetric flow rates. Sand/proppant is problematic for production and treatment systems located further downstream, where equipment such as pumps, gas/oil/water separators, and heater treaters can become packed with sand over time, leading to equipment failures and unplanned shut-downs, as well as the associated costs and overall loss of production. Generally, a high-pressure sand separator is capable of removing a large amount of sand from multi-phase flows such as are often encountered during the flowback operation, and therefore helps to reduce the negative effects that the sand might have on equipment downstream of the wellhead. As such, a sand separator is typically the first separation step placed after the wellhead and is generally rated for a pressure that is at least as high, or higher than, the wellhead shut-in pressure. This has the advantage of reducing wear on the choke valve, which is used to let down pressure and control the flow of gas, oil, and water coming from the well.

While automated systems for dumping the sand that accumulates in a solids separator are known in the art, each has associated shortcomings that reduce the reliability, efficiency, safety, and/or cost effectiveness of the system. One type of automated sand dump control system, sometimes referred to below as a "time-based" sand dump control system, utilizes one or more timers to automatically control the opening and closing of a dump valve in order to dump the accumulated sand from the separator vessel, such as the system disclosed in U.S. Pat. No. 6,672,335 to Welborn. In the typical sand dump control system, the timer is used to control the opening of the dump valve at specific pre-determined intervals, and to control the closing of the dump valve after pre-determined durations of time. Generally, the pre-determined intervals for opening the dump valve and the pre-determined durations after which the dump valve is closed are based on an anticipated volumetric production rate of solids particles (e.g., sand) to the separator vessel, the size of the separator vessel, and a pre-determined level of sand buildup within the separator vessel.

However, since the actual volumetric production of sand typically may vary over a relatively wide range of flow rates, the "time-based" method of automatically dumping sand can have significant operational drawbacks. For example, if the actual solids volumetric production rate is less than anticipated, the pre-determined frequency and/or duration of time that the dump valve remains open may be too high, thus resulting in greater amounts of hydrocarbon gas and oil carry under to the sand disposal tank, which is typically open to atmosphere. This in turn can lead to significant emissions of methane and many other hydrocarbon compounds that are toxic and/or known greenhouse gases which negatively impact the environment.

Furthermore, these emissions potentially raise safety concerns for personnel when hazardous substances such as hydrogen sulfide are present. Additionally, when there is little to no sand present in the separator vessel when the dump valve of the timed sand dump system is opened at its pre-determined interval, there can be a substantially unrestricted flow of the multi-phase effluent directly to the disposal tank, thus significantly increasing the overall cost of disposing of the materials, and increasing unnecessary wear on sand evacuation valves and piping. Similarly, when the actual volumetric production rate of sand is greater than anticipated, the dump valve may not be opened often enough, or for a long enough duration of time, such that a buildup of sand occurs in the separator vessel, thus resulting in sand carry over to equipment, piping, and valves that are downstream of the separator. Such sand carry over generally causes a significant increase in the amount of erosion and sand buildup in downstream systems, thus requiring more frequent maintenance, repair, and/or replacement. Moreover, when the dump valve is not actuated at sufficient short intervals, or for sufficient durations of time, the sand buildup within the separator vessel may cause the sand dump vessel to become "cemented" with sand, or effectively clogged off to any flow, which may thus require the sand separator to be bypassed and taken out of service for maintenance and/or cleaning.

Additionally, the "time-based" method of automatically dumping sand from the separator vessel further creates difficulties in determining the actual volume of solids particles (e.g., sand) flowing back from the well, or the actual volumetric production rate of sand, with any degree of accuracy. This is because the "time-based" sand dump system generally does not provide any type of information on the amount of sand that is present in the separator vessel prior to opening the dump valve or after closing the dump valve. Since multiple wells are often located on a single well pad, multiple sand separators may be present (generally one separator per well) that typically dump the sand into a single sand dump vessel. As such, only a very general estimate of the total amount of produced solids particles can be obtained from the "time-based" method based on the assumptions that were initially made in defining the pre-determined intervals between dump valve openings and the pre-determined durations of time before dump valve closings.

Another type of prior art automated sand dump control system, sometimes referred to as a "level-based" sand dump control system, utilizes a plurality of level sensors to determine when to open and close a sand dump valve during the process of separating the solids particles (e.g., sand) from a multi-phase effluent, such as the system that is disclosed in U.S. Pat. No. 6,790,367 to Schmigel. For example, the system disclosed by Schmigel utilizes an upper solids level sensor that is positioned at the point of a pre-determined maximum solids level within the sand separator vessel and a lower solids level sensor that is positioned at the point of a pre-determined minimum solids level within the separator. Such a "level-based" automated sand dump control system is designed so that when the level of accumulated sand within the separator vessel rises to a point where it reaches the upper level sensor at the maximum vessel sand level, the upper level sensor sends a signal to a control module that in turn sends a signal to a valve actuator to open the sand dump valve so that the sand can flow out of the separator vessel. Thereafter, when the level of sand within the separator vessel falls to a point where it reaches the lower level sensor at the minimum vessel sand level, the lower level sensor sends another signal to the control module that in turn sends another signal to the valve actuator to close the sand dump nozzle, which stops the accumulated sand from flowing out of the separator vessel.

Unlike the previously described "time-based" sand dump control systems, the "level-based" sand dump control system can provide a more accurate means of measuring the volume of solids particles (e.g., sand) separated from the multi-phase effluent, since the dimensions/shape of the separator vessel and the distance between the maximum and minimum pre-determined sand levels are all known. However, the present inventors have determined through extensive testing and evaluation that level sensors based on commonly known sonar or thermal dispersion technologies do not have the necessary robustness and operational reliability to provide a functional solids level sensor when exposed to the high pressure (e.g., 10 ksi and higher) and the highly erosive environments that are commonly found in sand separator vessels. Furthermore, level sensors utilizing nuclear technology can be prohibitively expensive and operationally complex, thus making the use of such nuclear sensors difficult to justify from an engineering economics perspective. Moreover, these issues are only exacerbated by the need to use multiple such level sensors in the prior art sand separator vessels.

FIGS. 1A and 1B schematically illustrate a prior art system 10 that is commonly used for separating sand from a multi-phase effluent flowing from a drilled wellbore, such as a multi-phase flowback fluid, by using a compact cyclonic device, sometimes referred to as a "desanding cyclone" or "desanding hydrocyclone." As shown in FIGS. 1A and 1B, the system 10 includes a separator vessel 34 having a hydrocyclone 47 and an effluent inlet 36 for receiving a multi-phase fluid 90 that typically includes a mixture of water, hydrocarbon, and sand particles 92. The effluent inlet 36 is configured to generate a swirling flow of the multi-phase fluid 90 within the hydrocyclone 47, and centrifugal forces quickly move the sand particles 92 towards the outer wall of the hydrocyclone 47. The sand particles 92 remain near the wall and are pulled down by gravity along a lower conically shaped section, where they exit the hydrocyclone 47 through a lower opening and eventually fall into a lower accumulator section 34b of the separator vessel 34. The accumulated sand particles 92 are periodically dumped from the accumulator section 34b through a sand outlet 40 in the bottom of the separator vessel 34, which is in turn directed to a sand collection tank (not shown). While the sand particles 92 are being separated from the multi-phase fluid 90 during this cyclonic separation process, a flow of clean water/hydrocarbons 94 is extracted from the top of the hydrocyclone 47 through a tube or outlet 38 located at the center of the swirling flow. The clean water/hydrocarbon 94 is then directed away from the system 10 through a water/hydrocarbon outlet line 77 for additional processing and treatment in downstream systems and equipment (not shown).

A well-known issue with this configuration of the system 10 is that the sand particles 92 tend to concentrate in the lower conical section of the hydrocyclone 47, where they may form a dense phase that can plug the outlet opening at the bottom of the hydrocyclone 47, as shown in FIG. 1B. When such plugging occurs, the sand 92 is unable to exit the hydrocyclone 47 and can partially or completely fill the hydrocyclone 47, thus rendering it unable to perform any further sand separation. As a consequence, the flow stream 94a extracted from the outlet 38 of the hydrocyclone 47 will include entrained sand particles 92, which in turn will carry over to the downstream processing or treatment systems.

FIG. 2 schematically depicts a modified prior art system 10a that is sometimes used to mitigate the sand plugging problems in the lower conical portion of the hydrocyclone 47 shown in FIG. 1B and described above. Due to the flow profile through hydrocyclone 47, a certain pressure differential will exist between the clean water/hydrocarbon outlet line 77 and the accumulator section of the separator vessel 34, such that the pressure in the outlet line 77 is lower than the pressure in the accumulator section 34b. As shown in FIG. 2, a flow line 79 is used to make a hydraulic connection between the accumulator section 34b and the outlet line 77, and a small regulated flow of liquid is allowed to pass from the accumulator section 34b to the outlet line 77 via the flow line 79. Flow through the flow line 79, often referred to as a "flux line," is regulated using a configuration that provides a desired amount of hydraulic resistance to the flow through the flux line 79. For example, the desired hydraulic resistance can be achieved by selecting an appropriate line size diameter, an appropriate orifice size, or an appropriately designed valve, such as the valve 72 shown in FIG. 2. During operation of the modified system 10a, the lower pressure of the fluid 94 flowing through the outlet line 77 generates suction through the flux line 79 on the accumulator section 34b of the separator vessel 34, and that suction in turn causes a downward flow at the bottom outlet of the lower conical section of the hydrocyclone 47. This downward flow promotes the flow of sand particles 92 out of hydrocyclone 47, thereby helping to reduce incidents of sand plugging the bottom outlet in the lower conical section.

However, operational experience of the inventors with modified systems such as the system 10a depicted in FIG. 2 has shown that the sand concentration coming from a well can be highly irregular, and as such high concentrations of sand particles 92 may pass through the separator vessel 34 for short periods of time. During such events, the lower conical section of the hydrocyclone 47 may fill with sand very quickly, thus causing the bottom outlet of the hydrocyclone 47 to become plugged despite having a flux line 79 installed between the accumulator section 34b and the outlet line 77. It should also be appreciated by those of ordinary skill that many other pieces of debris that are larger than the sand/proppant, such as plug parts, parts of seal rings, and other metallic and non-metallic parts, may enter the separator vessel 34 along with the multi-phase effluent flow of water/hydrocarbons and sand/proppant. Many of these larger pieces of non-sand debris (i.e., parts of seal rings and other metallic or non-metallic parts) may be captured by a screen assembly before the flow stream 90 enters the hydrocyclone 47. However, some pieces of non-sand debris that are substantially larger than the sand particle 92, such as drilled out plug parts and the like, may still enter the hydrocyclone 47, thus increasing the possibility that the lower conical section of the hydrocyclone 47 may become plugged.

When a sand-dumping event is performed, a large pressure differential will typically occur between the accumulator section 34b and the inlet 36 and outlet 38 of the hydrocyclone 47. Oftentimes, this pressure differential is sufficient to unplug the bottom outlet in the lower conical section of the hydrocyclone 47. It should be appreciated by those of ordinary skill that when time-based methods of automatically dumping the sand are used, the bottom outlet of the hydrocyclone 47 may remain plugged for extended periods of time, and at least until the next timed sand dumping event takes place. However, when level-based automated sand dump schemes are employed, a plugging event of the hydrocyclone 47 can lead to a situation where the sand is no longer able to flow into and fill the accumulator section 34b up to the level of an upper level sensor. In such circumstances, the upper level sensor will not send a signal to actuate the automatic sand dumping system, and the sand will not be dumped from the separator vessel 34. Furthermore, since a sand dumping event is not performed, the above-described plug-clearing pressure differential will also not occur and the lower conical section of the hydrocyclone 47 will generally remain plugged for the duration of the separation activity, or until a sand dump operation is initiated manually, thus promoting substantially continuous sand carry over to downstream systems.

In light of the recognized shortcomings of known automated sand dump systems, there is a need to provide new and unique system designs and methods for detecting and handling solids particles (e.g., sand) in high pressure separator vessel applications for oil and gas well operations. The present disclosure is therefore directed to systems, apparatuses, and methods that may be used to reduce and mitigate at least some of the problems associated with the prior art systems described above.

SUMMARY OF THE DISCLOSURE

The following presents a simplified summary of the present disclosure in order to provide a basic understanding of some aspects disclosed herein. This summary is not an exhaustive overview of the disclosure, nor is it intended to identify key or critical elements of the subject matter disclosed here. Its sole purpose is to present some concepts in a simplified form as a prelude to the more detailed description that is discussed later.

Generally, the subject matter disclosed herein is directed to new and unique systems, apparatuses, and methods that may be used for the automated detection and handling of solids particles, such as sand and the like, that is separated from a multi-phase fluid that is returned from a drilled wellbore. Some embodiments of the systems and methods disclosed herein are related to a differential pressure based automated detection and handling system.

One illustrative system disclosed herein includes a separator vessel that is adapted to separate solids particles from a flow of a multi-phase fluid, a differential pressure sensing system that is adapted to measure a differential pressure of a column of the multi-phase fluid in the separator vessel and a control system that is adapted to determine at least one of a level, volume or weight of the separated solids particles within the separator vessel based upon at least the measured differential pressure of the column of the multi-phase fluid in the separator vessel.

One illustrative method disclosed herein includes separating solids particles from a flow of a multi-phase fluid in a separator vessel, measuring a differential pressure of a column of the multi-phase fluid in the separator vessel and determining at least one of a level, volume or weight of the separated solids particles within the separator vessel based upon at least the measured differential pressure of the column of the multi-phase fluid in the separator vessel.

In one illustrative embodiment, a system is disclosed that includes, among other things, a separator vessel that is adapted to separate solids particles from a flow of a multi-phase fluid, a level sensor that is coupled to the separator vessel, wherein the level sensor includes a viscosity sensor that is adapted to measure changes in the viscosity of a fluid mixture that includes the solids particles separated from the flow of multi-phase fluid by the separator vessel. Additionally, a control system is adapted to determine a level of the separated solids particles accumulated in the separator vessel from the changes in the viscosity of the fluid mixture measured by the viscosity sensor.

In another exemplary embodiment, a method of treating a flow of a multi-phase fluid is disclosed that includes separating solids particles from the flow of multi-phase fluid in a separator vessel, measuring changes in the viscosity of a fluid mixture that includes the separated solids particles, and determining a level of the separated solids particles accumulated in the separator vessel from the changes in the viscosity of the fluid mixture measured by the viscosity sensor.

Also disclosed herein is an illustrative method of detecting if a bottom outlet of a hydrocyclone in a sand separator is plugged, wherein the method includes, among other things, determining a first pressure in a flux line that provides fluid communication between a sand accumulator section of the sand separator and a water/hydrocarbon outlet line exiting the sand separator, wherein the flux line has one of a control valve or orifice positioned between the sand accumulator section and the water/hydrocarbon outlet line. The method also includes determining a second pressure in the water/hydrocarbon outlet line and comparing the first pressure to the second pressure.

BRIEF DESCRIPTION OF THE DRAWINGS

The disclosure may be understood by reference to the following description taken in conjunction with the accompanying drawings, in which like reference numerals identify like elements, and in which:

FIGS. 1A and 1B are schematic views of a prior art system for separating sand from a multi-phase effluent flowing from a drilled wellbore;

FIG. 2 is a schematic view of a modified prior art system for separating sand from a multi-phase effluent that is based on the prior art system shown in FIGS. 1A and 1B;

Figure 3:
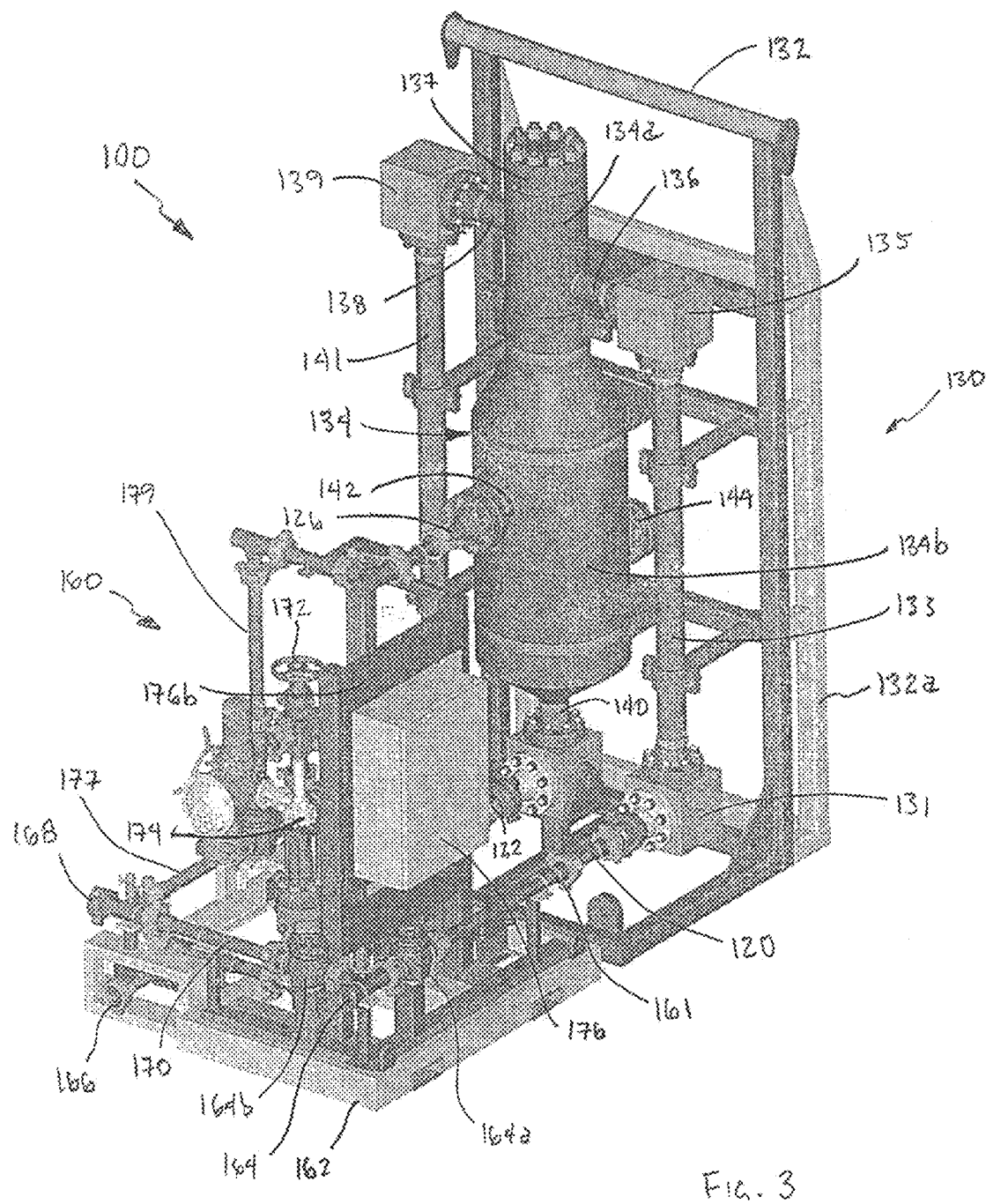
FIGS. 3 and 4 are isometric views of an exemplary solids particle detection and handling system in accordance with some illustrative embodiments of the present disclosure.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the subject matter defined by the appended claims to the particular forms disclosed, but on the contrary, the intention is to cover all modifications, equivalents, and alternatives falling within the spirit and scope of the claimed subject matter.

DETAILED DESCRIPTION

Various illustrative embodiments of the present subject matter are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

As used in this description and in the appended claims, the terms "substantial" or "substantially" are intended to conform to the ordinary dictionary definition of that term, meaning "largely but not wholly that which is specified." As such, no geometrical or mathematical precision is intended by the use of terms such as "substantially flat," "substantially perpendicular," "substantially parallel," "substantially circular," "substantially elliptical," "substantially rectangular," "substantially square," "substantially aligned," and/or "substantially flush," and the like. Instead, the terms "substantial" or "substantially" are used in the sense that the described or claimed component or surface configuration, position, or orientation is intended to be manufactured, positioned, or oriented in such a configuration as a target. For example, the terms "substantial" or "substantially" should be interpreted to include components and surfaces that are manufactured, positioned, or oriented as close as is reasonably and customarily practicable within normally accepted tolerances for components of the type that are described and/or claimed. Furthermore, the use of phrases such as "substantially conform" or "substantially conforms" when describing the configuration or shape of a particular component or surface, such as by stating that "the configuration of the component substantially conforms to the configuration of a rectangular prism," should be interpreted in similar fashion.

Furthermore, it should be understood that, unless otherwise specifically indicated, any relative positional or directional terms that may be used in the descriptions set forth below—such as "upper," "lower," "above," "below," "over," "under," "top," "bottom," "vertical," "horizontal," "lateral," and the like—have been included so as to provide additional clarity to the description, and should be construed in light of that term's normal and everyday meaning relative to the depiction of the components or elements in the referenced figures. For example, referring to the cross-sectional view of the separator vessel 134 depicted in FIG. 11, it should be understood that the opening 149e at the "upper" end of the internal riser tube 149a is positioned at a height level that is "vertically above" the "lower" end of the solids discharge tube 147a of the hydrocyclone apparatus 147, and that the pre-determined elevation 150e of the level sensor 154 is positioned at a height level that is "vertically below" the "lower" end of the solids discharge tube 147a and "vertically below" the "upper" end of the internal riser tube 149a.

Figure 4:
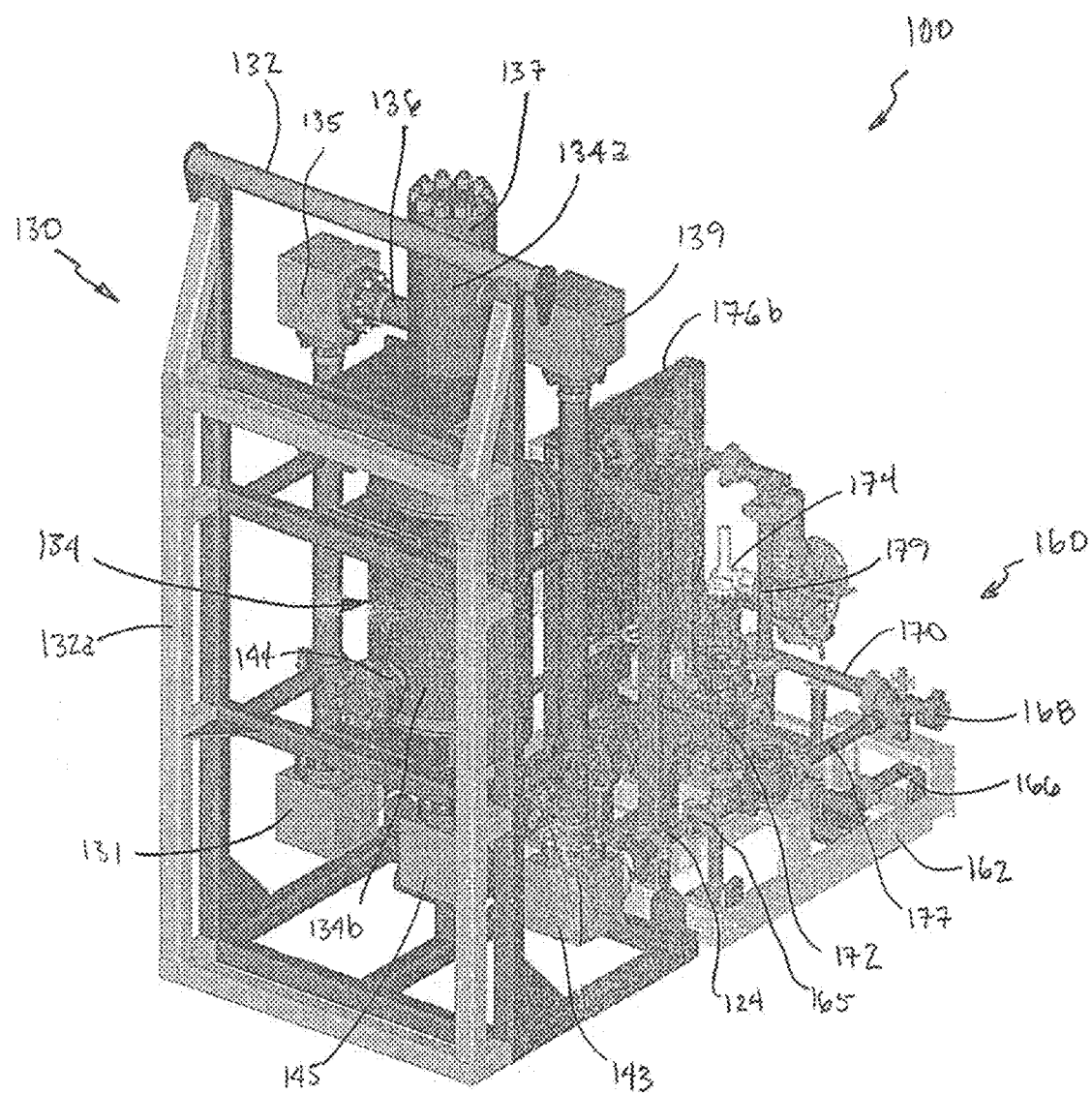

Generally, the subject matter disclosed herein provides various embodiments of systems, apparatuses, and methods that may be used for the detection and handling of solids particles, such as sand and the like, that is separated from a flow of a multi-phase fluid returned from a drilled wellbore during oil and gas well operations. With reference to the attached figures, FIG. 3 is an isometric view depicting one such exemplary solids particle detection and handling system 100 when viewed from a first or front side of the system and FIG. 4 is another isometric view of the system 100 shown in FIG. 3 when viewed from an opposite second or back side of the system 100. As noted previously, the solids particles that are typically separated from a multi-phase flowback effluent primarily consist of sand and/or other proppant materials that may be used during a well fracking operation, together with other solids particles that may be created during the fracking process. Accordingly, the solids particles may hereinafter be referred to in a shorthand fashion simply as "sand" in the following description and in the appended claims, and the system 100 may be referred to as a "sand detection and handling system 100," a "sand separation and dumping system 100," or a "sand dump system 100" and the like. However, it should be understood that such shorthand references shall not be considered limiting in any way on the present disclosure or the appended claims, as the term "sand" includes any and all solids particles that are returned from the wellbore with the multi-phase effluent and separated from the effluent in a separator vessel, irrespective of the type, size, and/or origin of the solids particles.

Referring now to FIGS. 3 and 4, the illustrative sand detection and handling system 100 may include a separator vessel package 130 that is operatively coupled to a control system package 160 by way of one or more interconnecting piping/coupling components 120, 122, 124, and 126 as well as electrical and/or instrument conduits (not shown) for operatively coupling a control panel 176 on the control system package 160 to various power and sensing components on the separator vessel package 130. For additional clarity, the separator vessel package 130 is depicted in a front side isometric view without the control system package 160 in FIG. 5, and the control system package 160 is shown in front side and rear side isometric views without the separator vessel package 130 in FIGS. 6 and 7, respectively.

Figure 5:
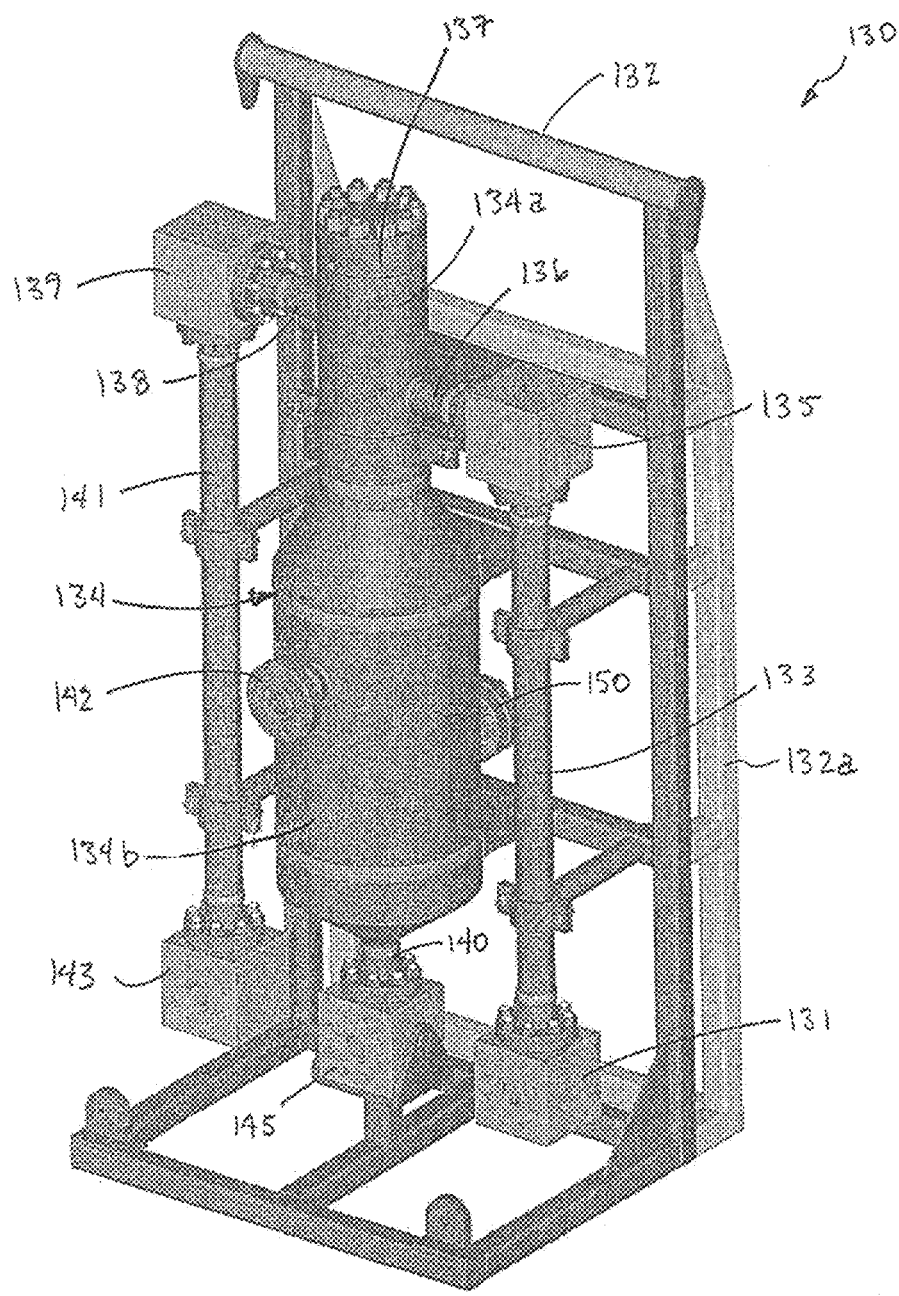
FIG. 5 is an isometric view of a separator vessel package of the exemplary solids particle detection system shown in FIGS. 3 and 4.
Figure 6:
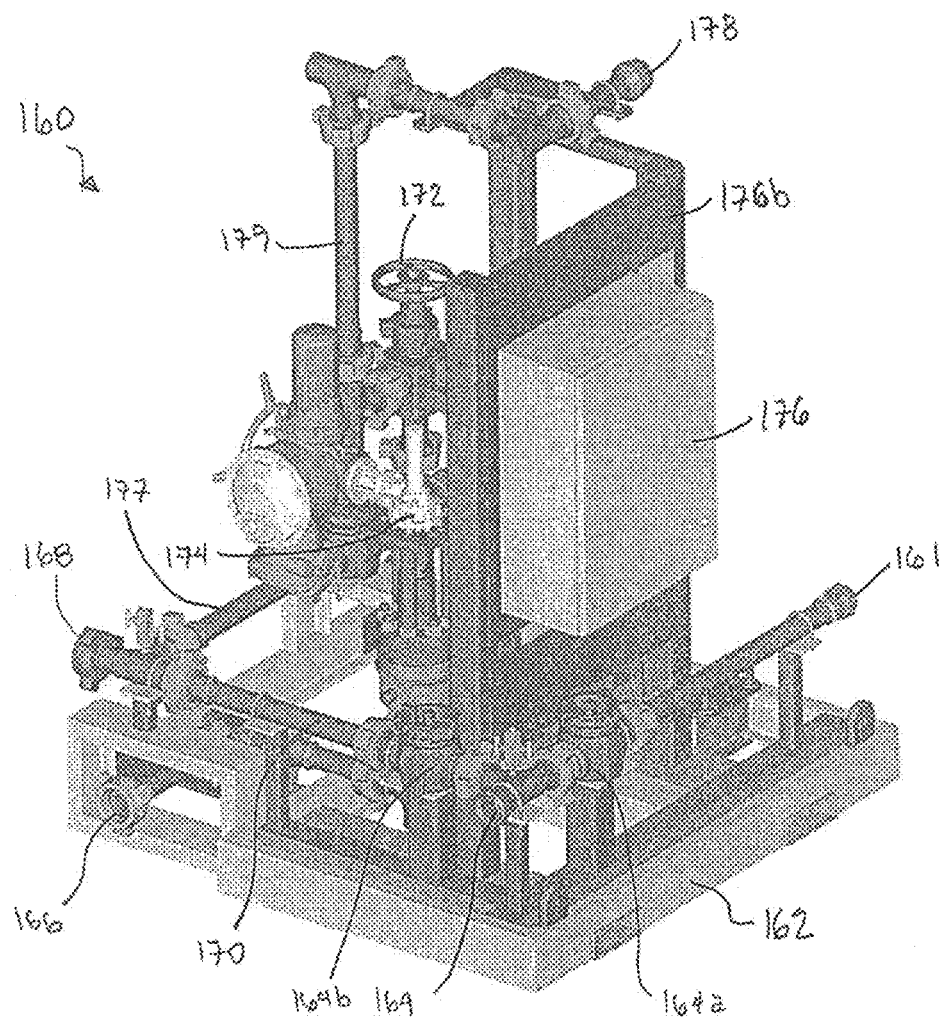
FIGS. 6 and 7 are isometric views of a control system package of the exemplary solids particle detection system shown in FIGS. 3 and 4.
Figure 7:
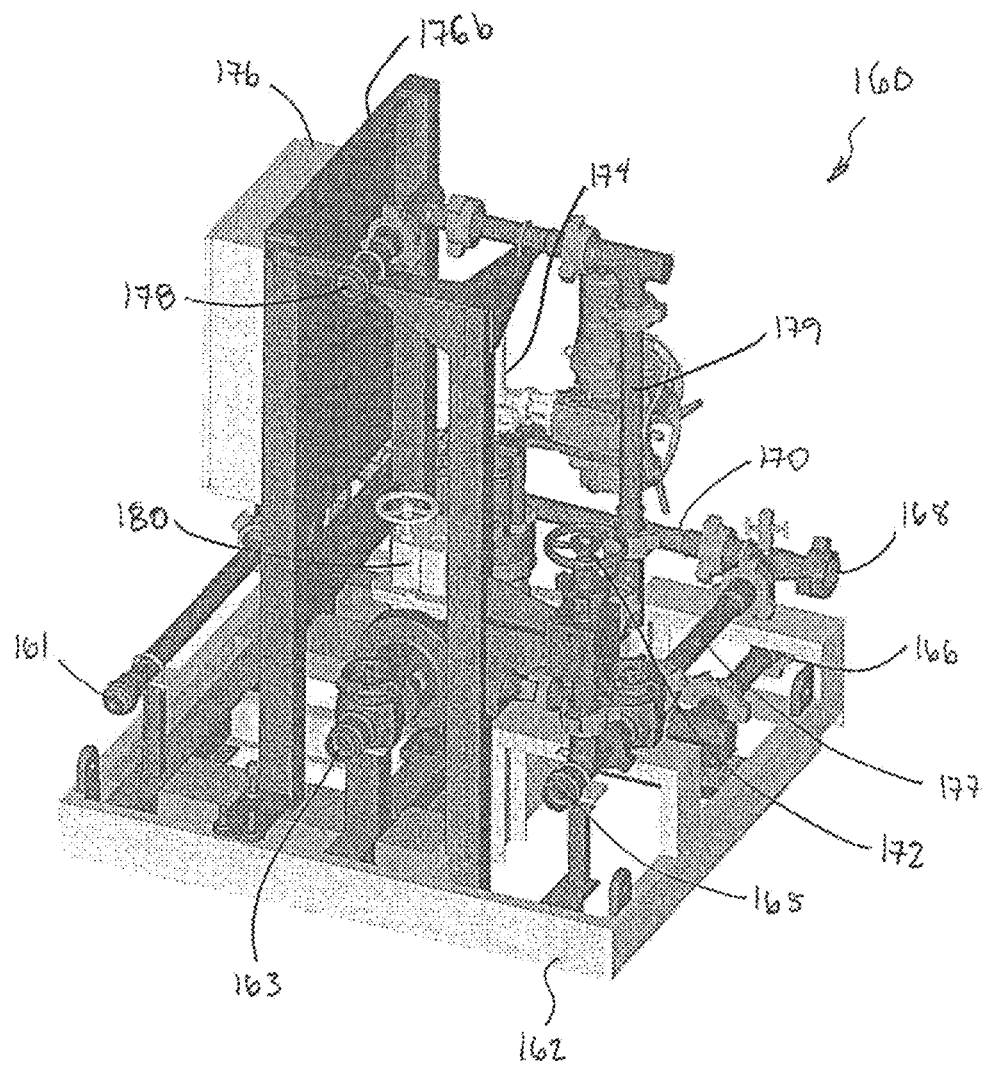

Additionally, the piping/coupling components 120, 122, 124, and 126 operatively coupling the separator vessel package 130 to the control system package 160 have been omitted from FIGS. 5-7.

As indicated in FIGS. 3, 4, 6 and 7, the control system package 160 may include a support skid 162 for supporting the various piping, valve, and instrument/control components of the control system package 160 during operation of the system 100, as well as during the transportation of the control system package 160 to a well site. The control system package 160 also includes a system inlet 164 for receiving a flow of multi-phase effluent that is returned from a wellbore via appropriate piping from a wellhead (not shown) and a skid outlet 161 that directs the flow of multi-phase effluent to the separator vessel package 130. An appropriately configured control panel 176 may be mounted on any one or more of the structural members that make up the support skid 162, such as the control panel bracket 176b. The control panel may house any appropriate system control devices for programming and controlling the operation of the sand detection and handling system 100, such as a programmable logic controller (PLC), human interface devices, data storage devices, and the like, depending on the particular design and operation parameters of the system 100.

The separator vessel package 130 includes a separator vessel 134 that is adapted to receive the multi-phase effluent from the skid outlet 161 on the control system package 160 via piping/coupling components 122. The separator vessel package 130 may also include a support skid 132 for transporting the separator vessel package 130 to the well site and supporting the separator vessel package 130 during system operation. In the particular embodiment depicted in FIGS. 3-5, the separator vessel 134 is shown in its normal operating position as a vertically oriented vessel, and the support skid 132 is configured such that the separator vessel package 130 may be transported to the well site in a shipping orientation (not shown) wherein the skid members 132a are supporting the separator vessel 134 in a substantially horizontal orientation. However, it should be appreciated by those of ordinary skill after a complete reading of the present disclosure that the exemplary sand detection and handling system 100 is not so limited to the use of a vertical separator vessel as shown in FIGS. 3-5, because it is well within the design and operational characteristics of the system 100 to use a horizontal separator vessel. Accordingly, the particular vessel configurations shown in the figures are illustrative only and should not be considered as limiting on the disclosed subject matter, other than as may be specifically indicated in the appended claims.

As shown in FIGS. 3-5, the separator vessel 134 may include an upper vessel section 134a that is adapted to receive a flow of the multi-phase effluent from the control system package 160 and a lower vessel section 134b, or accumulator section 134b, that is adapted to accumulate the sand that is separated from the multi-phase effluent by the separator vessel 134. In the illustrated embodiment, the upper vessel section 134a has a multi-phase effluent inlet 136 for receiving the multi-phase effluent and the lower vessel section 134b has a sand outlet 140 for discharging the accumulated sand out of the separator vessel 134. The upper vessel section 134a also includes a clean (i.e., free of sand) water/hydrocarbon outlet 138 from which substantially clean water and/or hydrocarbons are discharged from the separator vessel 134. Additionally, on certain embodiments, the lower vessel section 134b of the separator vessel 134 may also include a flux outlet 142 that is adapted to evacuate a portion of the sand-free liquid present in the separator vessel 134 above the level of any accumulated sand so that an additional like portion of separated sand can be further accumulated in the lower vessel section 134b when the internal pressure in the upper and lower vessel sections 134a and 134b equalizes during operation of the system 100.

With particular reference to the exemplary embodiment depicted in FIG. 5, the separator vessel package 130 may include various fittings and piping components for transferring the multi-phase effluent from the control system package 160 to the separator vessel 134 for separation processing, and for transferring the separated sand and the substantially clean water and hydrocarbons exiting the separator vessel 134 to the control system package 160 for subsequent disposal (in the case of sand) and/or further processing (in the case of the water/hydrocarbons). For example, the multi-phase effluent exiting the skid outlet 161 on the control system package 160 may pass to the inlet 136 in the upper vessel section 134a via the piping/coupling component 120 (see FIG. 3) that is coupled to the skid outlet 161 and a lower elbow fitting 131 on the effluent inlet side of the separator vessel 134, a pipe spool 133 that is coupled at its lower end to the lower elbow fitting 131, and an upper elbow fitting 135 on the effluent inlet side of the separator vessel 134 that is coupled to the upper end of the pipe spool 133 and to the multi-phase effluent inlet 136. Similarly, the substantially clean water and/or hydrocarbons exiting the upper vessel section 134a may pass to a water/hydrocarbon inlet 165 on the control system package 160 (see FIG. 7) via an upper elbow fitting 139 on the water/hydrocarbon outlet side of the separator vessel 134 that is coupled to the clean water/hydrocarbon outlet 138 and an upper end of a pipe spool 141, a lower elbow fitting 143 on the water/hydrocarbon outlet side of the separator vessel 134 that is coupled to the lower end of the pipe spool 141, and the piping/coupling component 124 (see FIG. 4) that is coupled to the water/hydrocarbon inlet 164. Additionally, the accumulated sand that is dumped from the lower vessel section 134b may pass to a sand inlet 163 on the control system package 160 (see FIG. 7) via an elbow fitting 145 that is coupled to the sand outlet 140 and the piping/coupling component 122 (see FIG. 3) that is coupled to the sand inlet 163.

In the embodiment shown in FIGS. 3-5, the elbow fittings 131, 135, 139, 143, and 145 have been depicted as block elbow fittings due to the high pressure system design, as well as the high erosion rates that would normally be expected in at least the multi-phase effluent inlet line leading from the control system package 160 to the multi-phase effluent inlet 136 in the upper vessel section 134a and the sand outlet line leading from the sand outlet 140 in the lower vessel section 134b to the control system package 160. Additionally, the connections coupling the elbow fittings to respective pipe spools and the inlets or outlets to and from the separator vessel 134 are shown as bolted flanged connections for ease of removability for maintenance, repair, and/or replacement. However it should be understood by those of ordinary skill that other connection types other than bolted flange connections may be used, such as clamp-type connections, threaded connections, hammer union connections and the like, depending on the particular design parameters and operating conditions of the various components of the system 100. Furthermore, it should also be understood that when component removability is unnecessary or a less critical parameter, the block fittings shown in FIGS. 3-5 may be replaced with suitable compact fittings, such as elbows and/or tees, or welded (i.e., not removable) connections may be used in at least some locations so as to reduce overall system costs.

With reference to FIGS. 3, 4, 6 and 7, the control system package 160 may further include a first sand outlet control valve 180 that is positioned downstream of the sand inlet 163, a second sand outlet control valve 174 that is positioned downstream of the first sand outlet control valve 180, and a sand outlet 166 through which the separated sand exiting the separator vessel 134 is discharged from the system 100 to a closed sand tank or vessel (not shown). The first and second sand outlet control valves 180/174 may be any type of suitably designed control valves, such as, for example, a plug valve, a cyclonic choke valve, a needle and seat choke valve, a cage choke valve, and the like. In some embodiments, the sand outlet control valves 180/174 may be opened sequentially, such that the first sand outlet control valve 180 is fully opened before the second sand outlet control valve 174 is opened. This scheme allows the first sand outlet control valve 180 to be protected from most of the erosive effects caused by the flow of sand through the sand outlet line due to the pressure that is trapped between the first and second sand outlet control valves 180/174 when the first sand outlet control valve 180 is opened. On the other hand, the second sand outlet control valve 174 receives most of the erosive wear, but it can be designed appropriately for such service. After a control signal has been received from the control panel 176, the first and second sand outlet control valves 180/174 are closed in reverse sequential order, such that the second sand outlet control valve 174 is fully closed before the first sand outlet control valve 180, thus again imposing most of the erosive wear on the suitably designed second sand outlet control valve 174 while substantially protecting the first sand outlet control valve 180 from such wear.

The control system package 160 also includes a water/hydrocarbon outlet line 177 leading from the water/hydrocarbon inlet 165 to a water/hydrocarbon outlet 168 from which the substantially clean water and/or hydrocarbons are discharged from the system 100 for further treatment and/or processing. Additionally, in those exemplary embodiments in which the separator vessel 134 includes a flux outlet 142, the control system package 160 may also include a flux inlet 178 and a flux line 179 that ties into the water/hydrocarbon outlet line 177. In this way, any sand-free liquid that may be evacuated from the separator vessel 134 through the flux outlet 142 during system operation (as described previously) can be discharged from the system 100 through the water/hydrocarbon outlet 168 on the control system package 160 together with the substantially clean water and/or hydrocarbons exiting the outlet 138 in the upper vessel section 134a. In certain embodiments, a control valve 172, such as a choke valve and the like, may be positioned in the flux line 179 between the flux inlet 178 and the water/hydrocarbon outlet line 177, which may be used to control a flow of sand-free liquid from the lower (accumulator) vessel section 134b of the separator vessel 134 to the water/hydrocarbon outlet line 177, as will be further described below. Depending on the design parameters and/or operating scheme of the particular embodiment of the system 100, the flow control valve 172 may either be manually operated or controlled by a PLC in the control panel 176.

Figure 8:
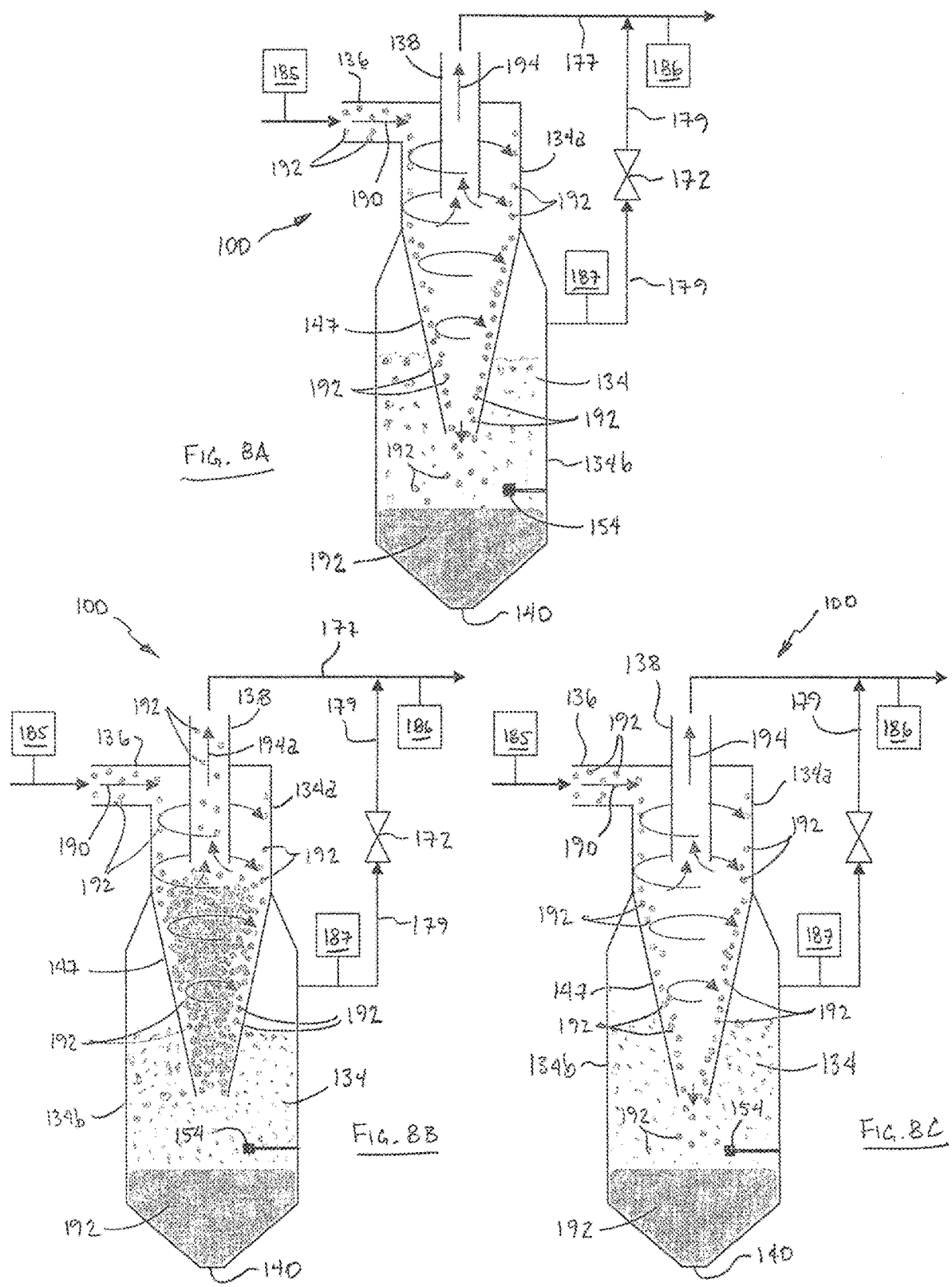
FIGS. 8A-8C are schematic views of some aspects of the solids particle detection and handling system of FIGS. 3-7 during different stages of system operation.

FIGS. 8A-8C are schematic views of some aspects of the solids particle detection and handling system 100 shown in FIGS. 3-7 during different stages of system operation. FIG. 8A shows the system 100 during normal operation, wherein the multi-phase effluent inlet 136 of the separator vessel 134 receives a flow of a multi-phase fluid 190 that typically includes a mixture of water, hydrocarbon, and sand particles 192. A swirling flow of the multi-phase fluid 190 is generated in a hydrocyclone 147 that is mounted in the upper vessel section 134a of the separator vessel 134, and the hydrocyclone 147 separates the sand particles 192 from the water and hydrocarbons in the multi-phase fluid 190. During this cyclonic separation process, a flow of clean water/hydrocarbon 194 is directed out of the hydrocyclone 147 through the water/hydrocarbon outlet 138 to the water/hydrocarbon outlet line 177 for transmission to downstream processing and/or treatment systems (not shown), and the separated sand particles 192 exit the hydrocyclone 147 through a lower opening and eventually fall into the lower (accumulator) vessel section 134b of the separator vessel 134. The sand particles 192 accumulate in the lower vessel section 134b until a solids level sensor 154 positioned inside of the separator vessel detects the level of the accumulated sand particles 192 and sends an appropriate signal to the control panel 176 (see FIGS. 3, 4, 6 and 7), which automatically dumps the sand 192 through the sand outlet nozzle 140, as will be further described in conjunction with FIGS. 9-14 below.

As shown in FIG. 8A, the system 100 includes a flux line 179 that provides fluid communication between the lower vessel section 134b and the water/hydrocarbon outlet line 177 so as to prevent a plugging or blockage of the bottom opening at the lower end of the hydrocyclone 147, as previously described with respect to FIG. 2 above. Additionally, a control valve 172, such as a choke valve 172, is positioned in the flux line 179 so as to control the flow of sand-free liquid from the lower vessel section 134b to the water/hydrocarbon outlet line 177. The system 100 depicted in FIG. 8A further includes various pressure sensors that are adapted to sense pressure at certain locations throughout the system 100 and send the sensed pressure information to appropriate elements of the control panel 176, e.g., a PLC, for monitoring the system 100 during operation. For example, a first pressure sensor 185 may be positioned at the inlet 136 to the separator vessel 134, a second pressure sensor 186 may be positioned on the water/hydrocarbon outlet line 177 downstream of the point where the flux line 179 ties into the outlet line 177, and a third pressure sensor 187 may be positioned on the flux line 179 upstream of the point where it ties into the outlet line 177.

During normal system operation, a pressure differential will generally exist between the lower (accumulator) vessel section 134b and the water/hydrocarbon outlet line 177 such that the pressure sensed by the third pressure sensor 187 is greater than the pressure sensed by the second pressure sensor 186, thus providing the necessary "suction" through flux line 176 to maintain a downward flow at the bottom outlet of the hydrocyclone 147. In other words, a pressure drop will exist across the control valve 172 when the system 100 is operating within normal parameters. Under this pressure differential operating scheme, the sand particles 192 can substantially continuously flow out of the bottom end of the hydrocyclone 147 and accumulate in the lower vessel section 134b until the level sensor 154 trips the automatic dump of sand 192 through the sand outlet nozzle 140.

Under some operating conditions, the multi-phase effluent 190 entering the separator vessel 134 may periodically and/or sporadically carry high concentrations of sand particles 192 for a short period of time, and other pieces of debris larger than sand may enter the hydrocyclone 147 (as previously described). These periodic increases in sand concentration and/or the presence of larger pieces of debris in the multi-phase effluent 190 can sometimes cause the bottom outlet at the lower end of the hydrocyclone 147 to become plugged or blocked. Once such a plugging or blockage occurs, the hydrocyclone 147 may then fill up with sand particles 192 and/or other debris, and eventually the hydrocyclone 147 is unable to further separate the sand particles 192 from the multi-phase fluid 190, thus resulting in a completely plugged hydrocyclone 147, as shown in FIG. 8B, wherein the fluid flow 194a exiting the outlet opening 138 of the separator vessel 134 carries over a significant amount of sand particles 192 to the downstream processing and/or treating systems.

When the bottom outlet of the hydrocyclone 147 is plugged as shown in FIG. 8B, there is no longer any fluid communication between the hydrocyclone 147 and the lower vessel section 134b. Under these conditions, the pressure in the lower vessel section 134b will equalize with the pressure in the outlet line 177 through the flux line 179, such that the pressure sensed by the third pressure sensor 187 is equal to the pressure sensed by the second pressure sensor 186. Stated another way, pressure across the control valve 172 will equalize. As such, the sensed pressure information provided by the second and third pressure sensors 186, 187 on the outlet line 177 and the flux line 179, respectively, can therefore be used to detect when the hydrocyclone 147 is plugged. The control panel 176 (not shown) can then use the sensed pressure information via an appropriate control element, such as a PLC, to trigger an event (e.g., an alarm) to shut down or bypass the system 100, and/or to initiate an emergency dumping of the accumulated sand 192 from the separator vessel 134. As noted previously, the pressure in the lower (accumulator) vessel section 134b may be reduced significantly during the sand dump, and as such the pressure differential between the hydrocyclone 147 and the lower vessel section 134b may be large enough to unplug the hydrocyclone 147, thus allowing normal operation of the system 100 to continue, as shown in FIG. 8C. Furthermore, when these operations are performed automatically based upon the sensed pressure information provided by the pressure sensors 186 and 187, the hydrocyclone 147 may not be plugged for an extended period, which would otherwise lead to significant carry over of sand 192 to downstream processing and/or treating systems. Moreover, in those operating scenarios wherein the hydrocyclone 147 remains plugged even after an emergency sand dump, an alarm can be sent identifying the issue for operators before significant sand carry over to downstream equipment can occur.

In the illustrative embodiments disclosed herein, the pressure sensors 185, 186 and 187 may be separate and individual pressure sensors, each including its own pressure transmitter to send information on the sensed pressure to the control panel 176. However, in other embodiments, differential pressure sensors may be used to detect a pressure differential between two locations, wherein only a single differential pressure transmitter is necessary to send information on the sensed pressure differential to the control panel 176. Additionally, individual pressure sensors may be used in combination with differential pressure sensors. For example, a single pressure sensor may be used to sense the pressure at the inlet 136 to the separator vessel 134 and a single differential pressure sensor may be used to sense the pressure differential between the pressure in the flux line 176 where it exits the lower vessel section 134b and the pressure in the water/hydrocarbon outlet line 177 downstream of the point where the flux line 176 ties into the outlet line 177. Furthermore, it should be appreciated by those of ordinary skill in the art that other combinations of individual pressure sensors and differential pressure sensors, or combinations of multiple differential pressure sensors, may also be used.

As shown in FIGS. 3, 4, 6 and 7, the control system package 160 may also include a bypass line 170 that is adapted to allow the multi-phase effluent returned from the wellbore to bypass the separator vessel 134 as may be necessary to allow maintenance and/or repairs of the separator vessel 134 to be performed offline. For example, appropriately positioned valves 164a/b may be operated, either manually or through controls included with the control panel 176, to bypass the separator vessel package 130 by redirecting the flow of multi-phase effluent through the bypass line 170 so that it can be discharged directly out of the system 100 through the water/hydrocarbon outlet 168.

Figure 9:
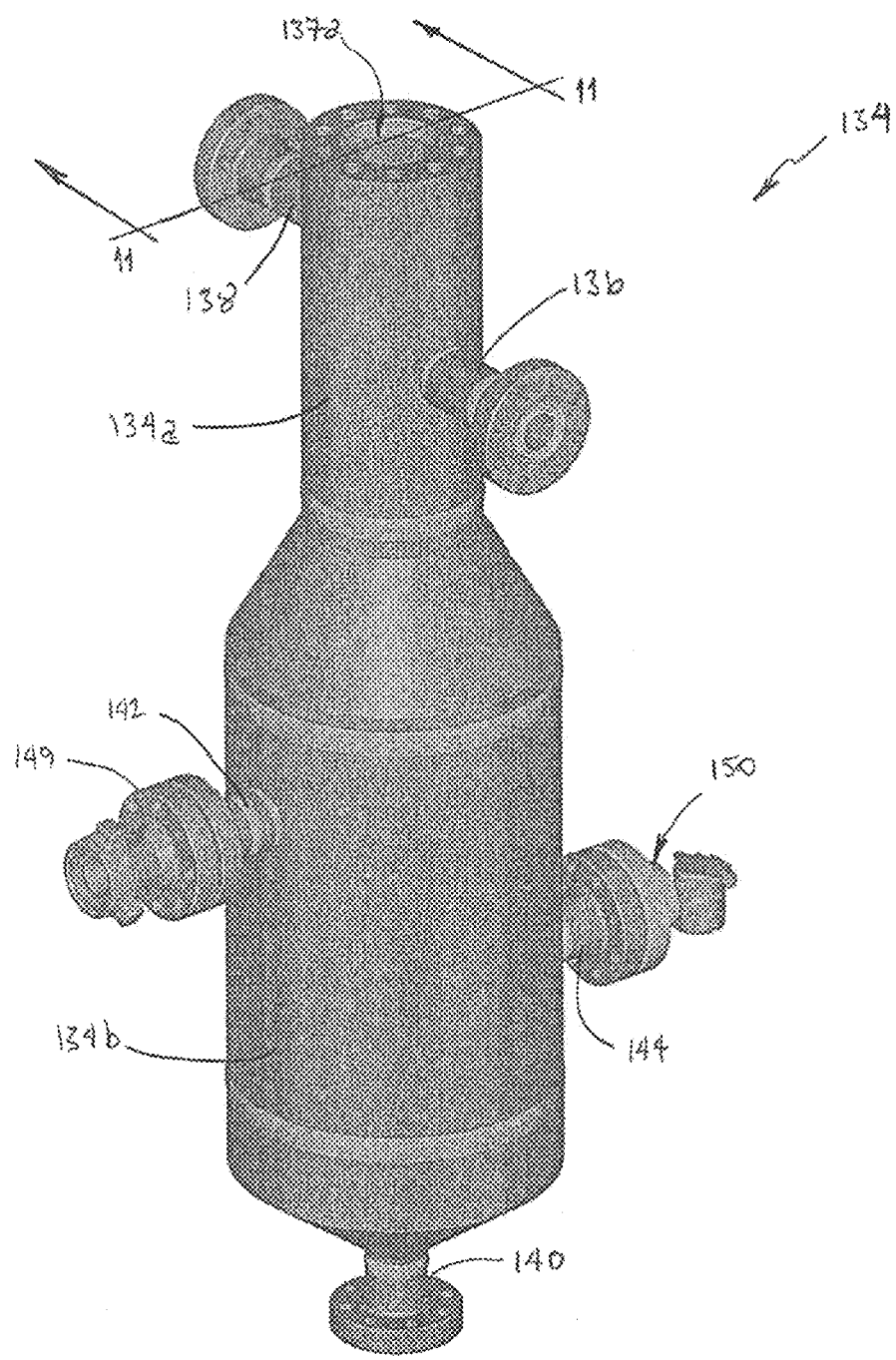
FIGS. 9 and 10 are isometric and side elevation views, respectively, of an illustrative separator vessel that may be used in the exemplary solids particle detection and handling system shown in FIGS. 3-5 in accordance with certain illustrative embodiments disclosed herein.
Figure 10:
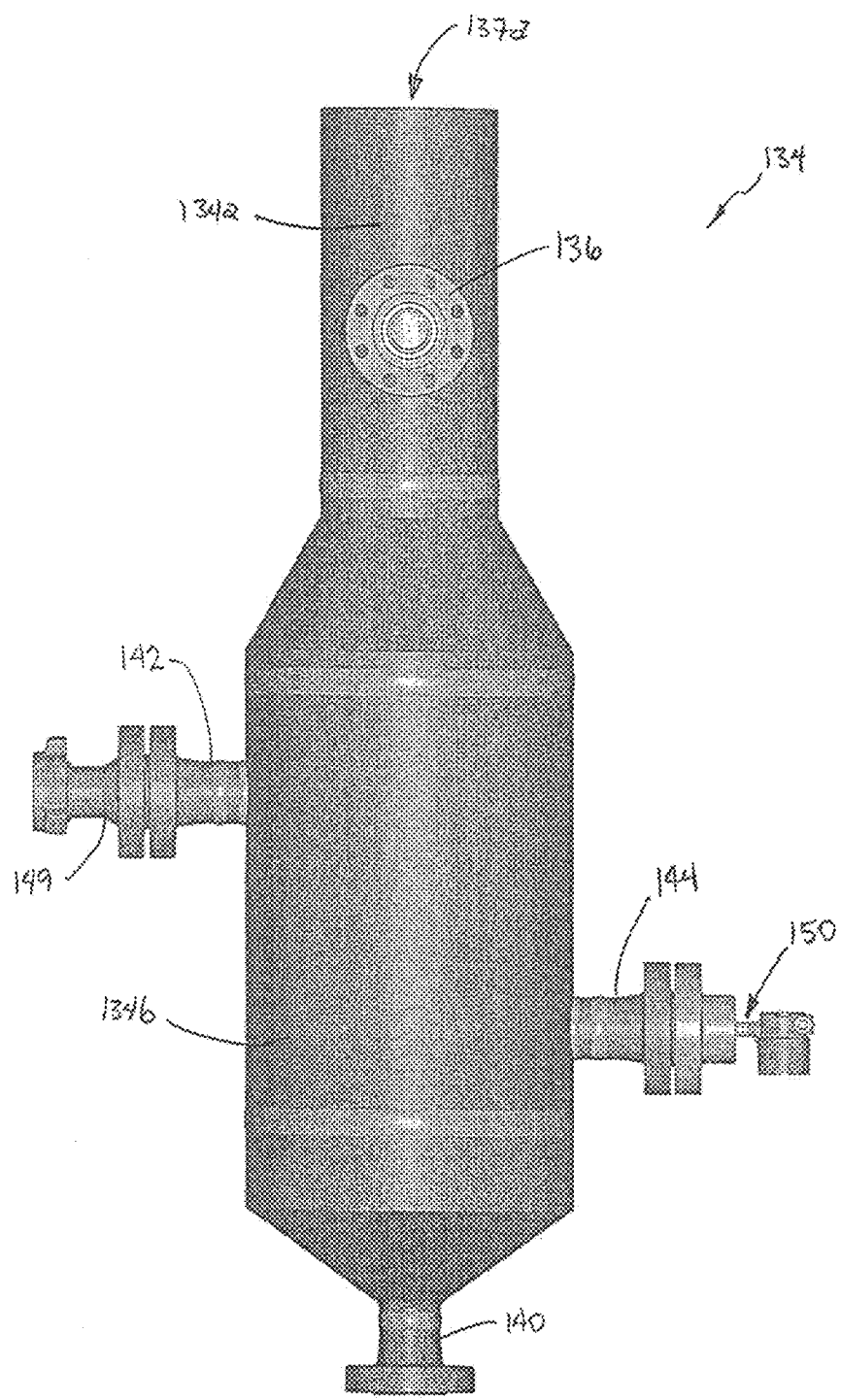
Figure 11:
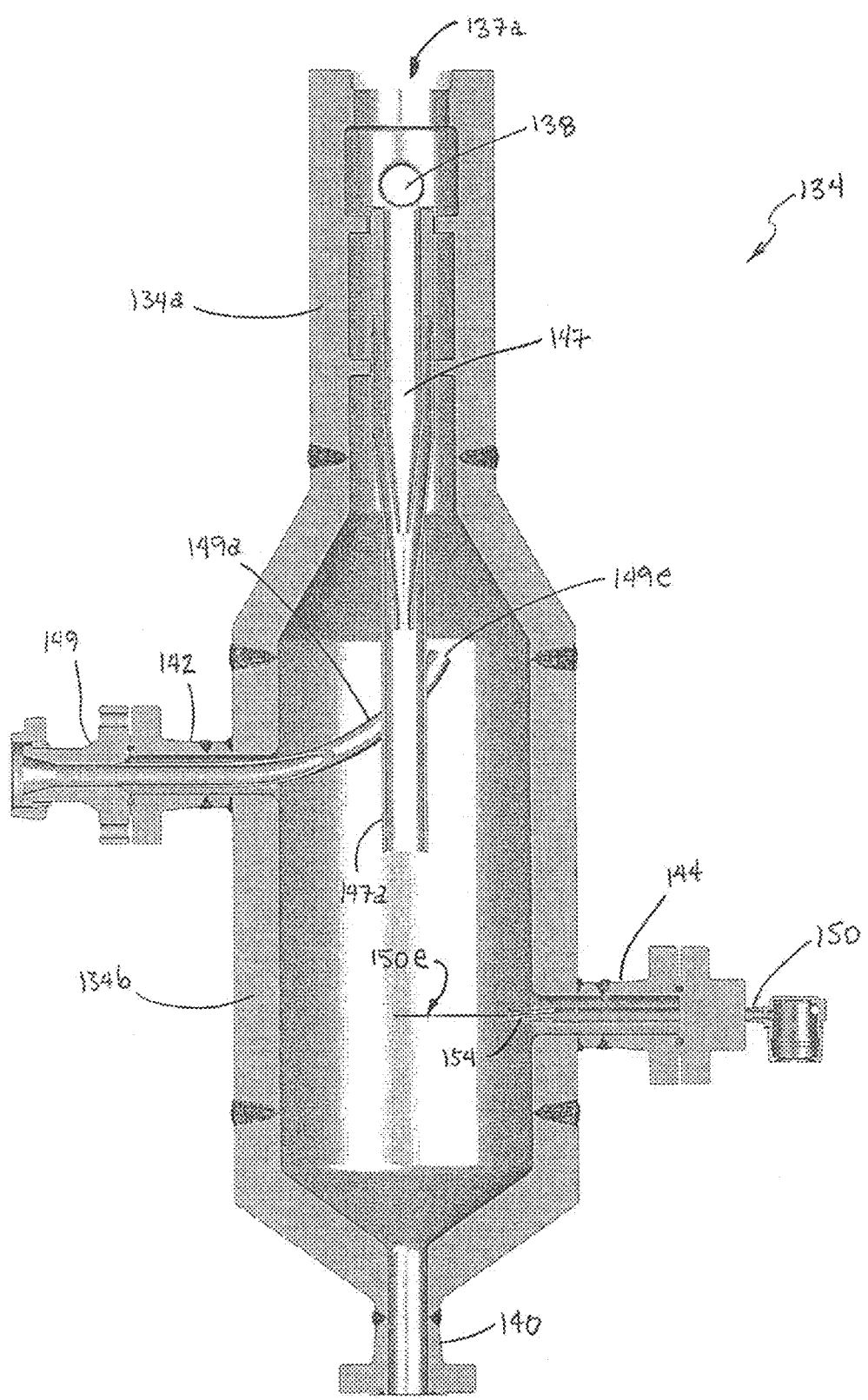
FIG. 11 is a cross-sectional view of the illustrative separator vessel depicted in FIGS. 9 and 10 when viewed along the section line "11-11" of FIG. 9.

FIGS. 9-11 show various additional detailed aspects of one illustrative embodiment of the separator vessel 134 depicted in FIGS. 3-5 and described above. In particular, FIGS. 9 and 10 are isometric and side elevation views, respectively, of the exemplary separator vessel 134 and FIG. 11 is a cross-sectional view of the illustrative separator vessel depicted in FIGS. 9 and 11 when viewed along the section line "11-11" shown in FIG. 9. As noted previously, the embodiment shown in FIGS. 9-11 is configured as a vertical separator vessel 134 having a multi-phase effluent inlet 136 and a clean water/hydrocarbon outlet 138 located in the upper vessel section 134a and a sand outlet 140 located at the bottom of the lower vessel section 134b. As shown in FIGS. 9-11, the separator vessel 134 also includes a flux outlet 142 and a sensor level nozzle 144 positioned in the lower vessel section 134b, as well as a solids level sensor package 150 that is removably coupled to the sensor level nozzle 144. In some embodiments, a liquid evacuation package 149 may be coupled to the flux outlet 142 so as to facilitate the evacuation of sand-free liquid under certain operating conditions of the separator vessel 134, as will be further described in conjunction with FIG. 11 below. Additionally, an access opening 137a may be provided at the top end of the upper vessel section 134a so as to provide access to internal components (see FIG. 11), wherein the access opening 137a may be blinded off with a bolted blind flange cover 137 (not shown in FIGS. 9-11; see FIGS. 3-5) during normal operation of the separator vessel 134.

As shown in FIG. 11, an internal hydrocyclone apparatus 147 may be positioned inside of the upper vessel section 134a such that a solids discharge tube 147a of the hydrocyclone apparatus 147 extends partially into the lower vessel section 134b. During separator vessel operation, the hydrocyclone apparatus 147 acts to separate sand that is entrained in the multi-phase effluent from water and hydrocarbon constituents, the separated sand is discharged through the lower end of the solids discharge tube 147a, and the lower vessel section 134b of the separator vessel 134 thereafter functions as a gravity separator by allowing the separated sand to settle and accumulate within the bottom region of the lower vessel section 134b. Also as shown in FIG. 11, the sensor level nozzle 144 and the solids level sensor package 150 are positioned in the lower vessel section 134b such that a level sensor 154 on the solids level sensor package 150 is at a pre-determined height level/elevation 150e above the bottom sand outlet 140 that substantially conforms to the maximum level of sand accumulation in the separator vessel 134. Generally, the pre-determined elevation 150e of the level sensor 154 is positioned below the lower end of the solids discharge tube 147a of the hydrocyclone apparatus 147 so that gravity separation of sand will properly occur in the bottom region of the lower vessel section 134b. Furthermore, the pre-determined elevation 150e may be based on any one of several design and operational considerations, including the desired volume of sand that will be accumulated in lower vessel section 134b before the level sensor 154 detects the presence of the sand, and any factors that may cause the accumulated sand might plug or "cement" the bottom sand outlet 140 so as to prevent the discharge of sand through the outlet 140.

With continuing reference to FIG. 11, the liquid evacuation package 149 may be removably coupled to the flux outlet 142, for example by way of a bolted flanged connection and the like. Furthermore, the liquid evacuation package 149 may include an internal riser tube 149a that extends through the bore/opening of the flux outlet 142 and upward into an upper region of the lower vessel section 134b in which sand-free liquid may typically be present during operation of the separator vessel 134, and such that an opening 149e at the upper end of the internal riser tube 149a is positioned at a height level that is vertically above the flux outlet 142, the lower end of the solids discharge tube 147a of the hydrocyclone apparatus 147, and the pre-determined elevation 150e of the level sensor 154. When configured in this manner, the liquid evacuation package 149 is adapted to evacuate sand-free liquid from this region of the lower vessel section 134b when the internal pressure in the upper and lower vessel sections 134a and 134b is substantially equalized so that additional amounts of separated sand can be allowed to accumulate in the separator vessel 134, as previously noted above.

For the embodiment depicted in FIGS. 9-11, the separator vessel 134 is designed and fabricated in accordance with Section VIII of the American Society of Mechanical Engineers Boiler and Pressure Vessel Code (ASME BPVC), although it should be appreciated that it may be designed and fabricated in accordance with other recognized national or international pressure vessel design and fabrication standards. Design conditions for the separator vessel 134 may vary depending upon the particular application and service, although when exposure to the full wellhead shut-in pressure is required, the design pressure of the separator vessel 134 may be as high as 10 ksi or even higher.

Figure 12:
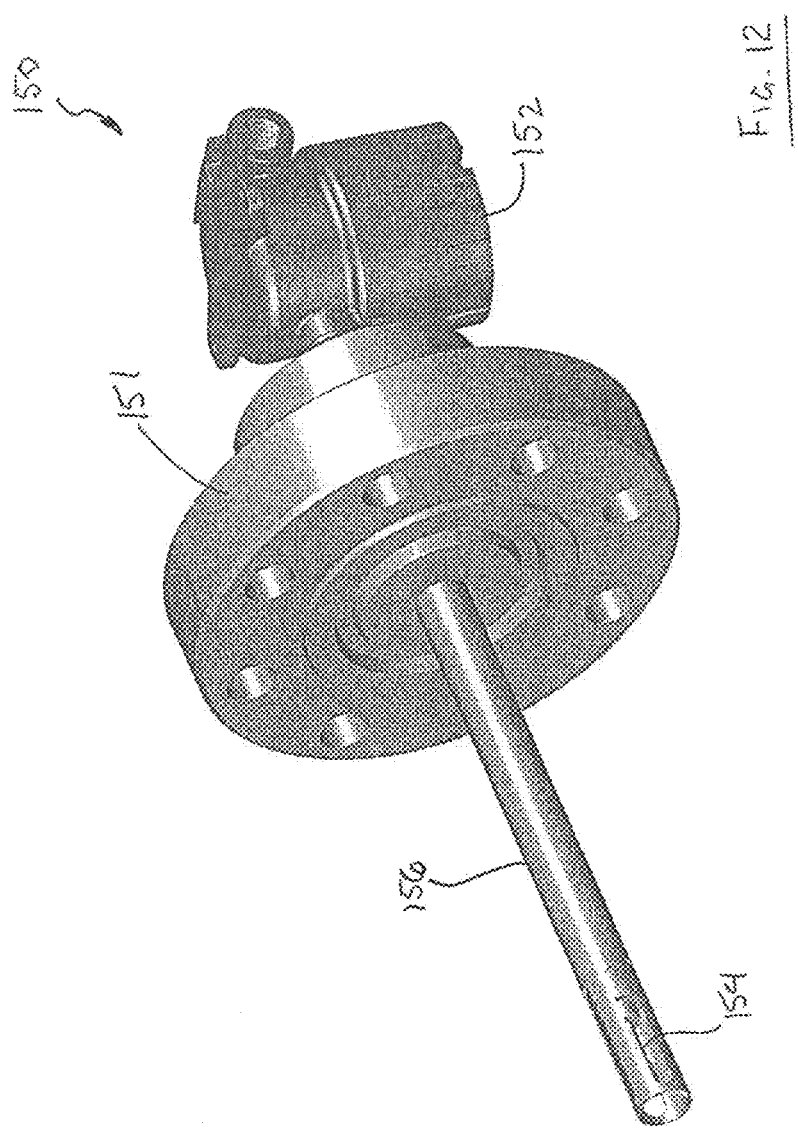
FIGS. 12 and 13 are isometric and side elevation views, respectively, of an exemplary solids level sensor mechanical package that may be used with the illustrative separator vessel depicted in FIGS. 9-11 in accordance with some exemplary embodiments of the present disclosure.
Figure 13:
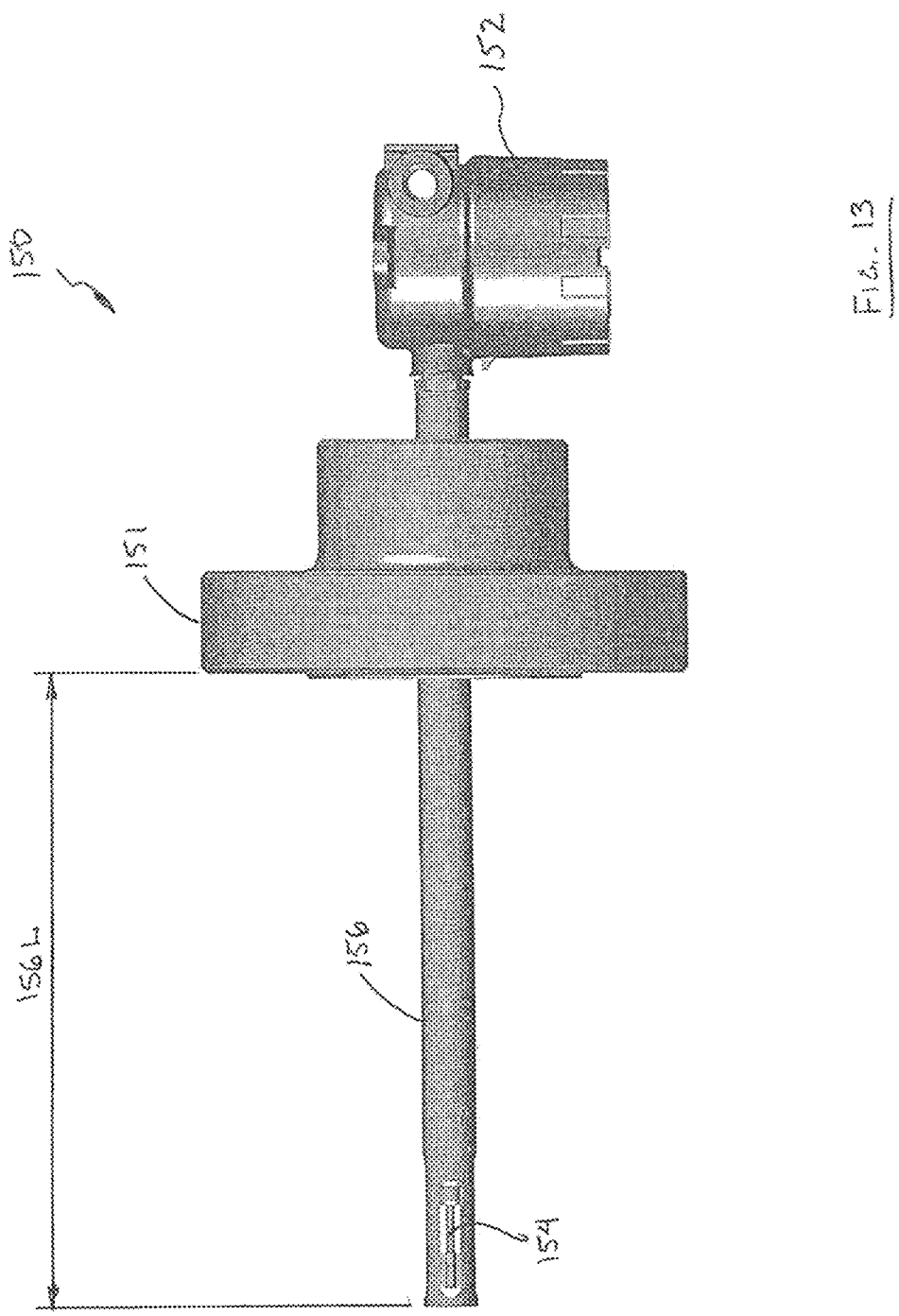

FIGS. 12 and 13 are isometric and side elevation views, respectively, of an exemplary solids level sensor package 150 in accordance with one illustrative embodiment of the present disclosure. In the depicted embodiment shown in FIGS. 12 and 13, the solids level sensor package 150 includes a flange 151 that is used to removably couple the solids level sensor package 150 to a separator vessel, such as, for example, to the sensor level nozzle 144 on the illustrative separator vessel 134 shown in FIGS. 9-11. An extension sleeve 156 is coupled to the flange 151, and the distal end of the extension sleeve 156 houses a level sensor 154 that is adapted to generate a signal indicating the level of solids particles (e.g., sand) within the separator vessel 134, as will be further described below. The extension sleeve 156 has a projection length 156L from the inside face of the flange 151 that may be adjusted as required for the level sensor 154 to project into the separator vessel by an appropriate distance from the inside surface so that the level sensor 154 is properly positioned to perform the required level sensing activity.

The extension sleeve 156 also houses all necessary wiring for electrically connecting the level sensor 154 to a transmitter 152 coupled to an outside face of the flange 151 so that the level detection signals generated by the level sensor 154 can be sent to the transmitter 152. The transmitter 152 may in turn be electrically connected to a control panel, such as the control panel 176 shown in FIGS. 3, 4, 6 and 7, so that the transmitter 152 can relay signals obtained from the level sensor 154 to the control panel 176 for controlling operation of the sand detection and handling system 100.

While the solids level sensor package 150 depicted in FIGS. 12 and 13 is based on a design configuration that uses a bolted flange connection for attaching the sensor package 150 to the separator vessel 134, it should be understood that the flange 151 is only illustrative of certain embodiments, as other types of mechanical connections known in the art can be incorporated into the design of the sensor package 150. For example, appropriately designed clamped connections or hammer unions may also be used without affecting the primary function of the solids level sensor package 150. Accordingly, the depiction of a flange 151 in FIGS. 12 and 13 should not be considered as limiting in any way on the disclosed subject matter, other than as may be specifically defined by the appended claims.

In some illustrative embodiments, the level sensor 154 may include a viscosity sensor that provides data on the viscosity of a multi-phase fluid that comes into contact with the level sensor. In such embodiments, the level sensor 154 is adapted to provide information on the level of solids particles (e.g., sand and the like) within a separator vessel by measuring changes in the viscosity of the multi-phase fluid. For example, in operation, when the multi-phase fluid contacting the level sensor 154 primarily consists of water, the viscosity sensor typically provides a viscosity measurement in the range of approximately 1-2 centipoise (cP). However, testing performed by the inventors indicates that when the multi-phase fluid contacting the level sensor 154 includes sand particles, the viscosity sensor provides viscosity measurements that are approximately 150 cP and higher. Furthermore, testing also shows that as the concentration of sand particles within the multi-phase fluid increases, the viscosity measurements provided by the viscosity sensor also increase commensurately. Accordingly, for the sand detection and handling system 100 shown in FIGS. 3-7, a correlation can be made between the viscosity measurements provided by the level sensor 154 and the level of accumulated sand in the separator vessel 134 based upon the concentration of sand particles in the multi-phase fluid that contacts the level sensor 154. From this, appropriate elements of the control panel 176, e.g., a PLC, can be used to determine when to actuate the first sand outlet control valve 180 to dump the sand from the separator vessel 134 through the sand outlet 140. Furthermore, since the volume of sand that accumulates in the bottom of the separator vessel 134 below the elevation level 150e of the level sensor 154 is a known quantity based on the geometry of the vessel, the duration that the first sand outlet control valve 180 remains open can readily be determined so as to avoid discharging undue amounts of water and/or hydrocarbons through the sand outlet 140. In certain other embodiments, the system 100 shown in FIGS. 3-7 may include a flow meter (not shown) that is positioned in the sand outlet line downstream of the separator vessel 134 and is adapted to detect the flow of sand in the sand outlet line and to provide a signal for operating the outlet control valve 180. In still other embodiments, an acoustic sensor may be provided in the sand outlet line to detect the flow of sand through the sand outlet line and provide similar signals for controlling the valve 180.

In view of the type of viscosity measurement data that is obtained by the level sensor 154 and how the system 100 analyzes that data to determine the level of accumulated sand in the separator vessel 134, only one level sensor 154 is required in order to continuously operate the system 100 while periodically automatically dumping the accumulated sand when a pre-determined sand level is reached. Therefore, unlike the prior art automated sand dumping systems that require two level sensors—i.e., an upper level sensor positioned at a maximum sand level and a lower level sensor positioned at a minimum sand level—the system 100 only requires a single level sensor 154 that is positioned at the pre-determined maximum sand level in order to continuously provide automated sand dumping during system operation, thus reducing overall system cost and complexity. Furthermore, tests performed by the inventors indicate that the viscosity sensor is capable of functioning normally by making the required viscosity measurements while withstanding operating pressures up to 10 ksi, thus providing the necessary robust design for use in high pressure separator vessel applications.

In other illustrative embodiments, the level sensor 154 may also include other sensors that provide data on additional characteristics of the multi-phase fluid that comes into contact with the level sensor 154. For example, in some embodiments, the level sensor 154 may include a density sensor that provides density measurements of the multi-phase fluid in specific gravity or mass density (g/cm3), and in other embodiments the level sensor 154 may include a sensor that provides measurements of the instrument resonance damping factor in hertz (Hz). Testing performed by the inventors indicates the density and damping factor measurements of the multi-phase fluid have a similar correlation to the presence of sand particles as does the viscosity measurement discussed above. As such, density and damping factor measurements of the multi-phase fluid contacting the level sensor 154 can also provide an indication of the level of accumulated sand in a separator vessel.

As will be appreciated by those of ordinary skill after a complete reading of the present disclosure, various embodiments of the level sensor 154 disclosed herein may include any combination of sensors that provide viscosity, density, and damping factor measurement data on the multi-phase fluid contacting the level sensor 154. For example, in one embodiment, the level sensor 154 may include a viscosity sensor and a density sensor, and in other embodiments the level sensor 154 may include a viscosity sensor and a damping factor sensor. In still other embodiments, the level sensor 154 may include a viscosity sensor, a density sensor, and a damping factor sensor. For example, the inventors have performed testing in high pressure conditions using an SRV Viscosity Monitoring sensor manufactured by Rheonics, Inc., which is adapted to provide data on the viscosity and damping factor of the multi-phase liquid it comes into contact with. However, it should be appreciated by persons having ordinary skill that other appropriately designed sensors that provide data on one or more of the viscosity, density, and/or damping factor of the multi-phase liquid may also be used provided the sensor(s) meet the design and operating conditions of the particular application. For example, in some embodiments, a DPV Viscosity and Density Monitoring sensor manufactured by Rheonics, Inc. may also be suitable for high pressure level sensing applications such as are described herein, although viscosity, density, and/or damping factor sensors from other manufacturers may also be used when appropriate testing and verification of the sensors is performed.

Embodiments of the sand detection and handling system 100 disclosed herein may also provide information on the total amount of sand production contained in the multi-phase effluent that is returned from the well during flowback operations, as well as the rate of sand production from the well. For example, since the elevation 154e of the level sensor 154 above the sand outlet nozzle 140 is known, the volume of sand that can accumulate in the lower vessel section 134b of the separator vessel 134 is also known. Furthermore, a PLC can be used to gather data on the total number of times that the accumulated sand is automatically dumped from the separator vessel, as well as the frequency at which it is dumped. From this information, estimates of the total sand production and the rate of sand production over time can be made. Furthermore, data analytics can be performed on the data gathered by each of the various sensors of the level sensor 154 together with all of the available operating condition data, including pressures, temperatures, and flow rates, to determine if any correlations can be made with the data that might provide valuable insight to operators on the characteristics of a given oil and gas well.

Figure 14:
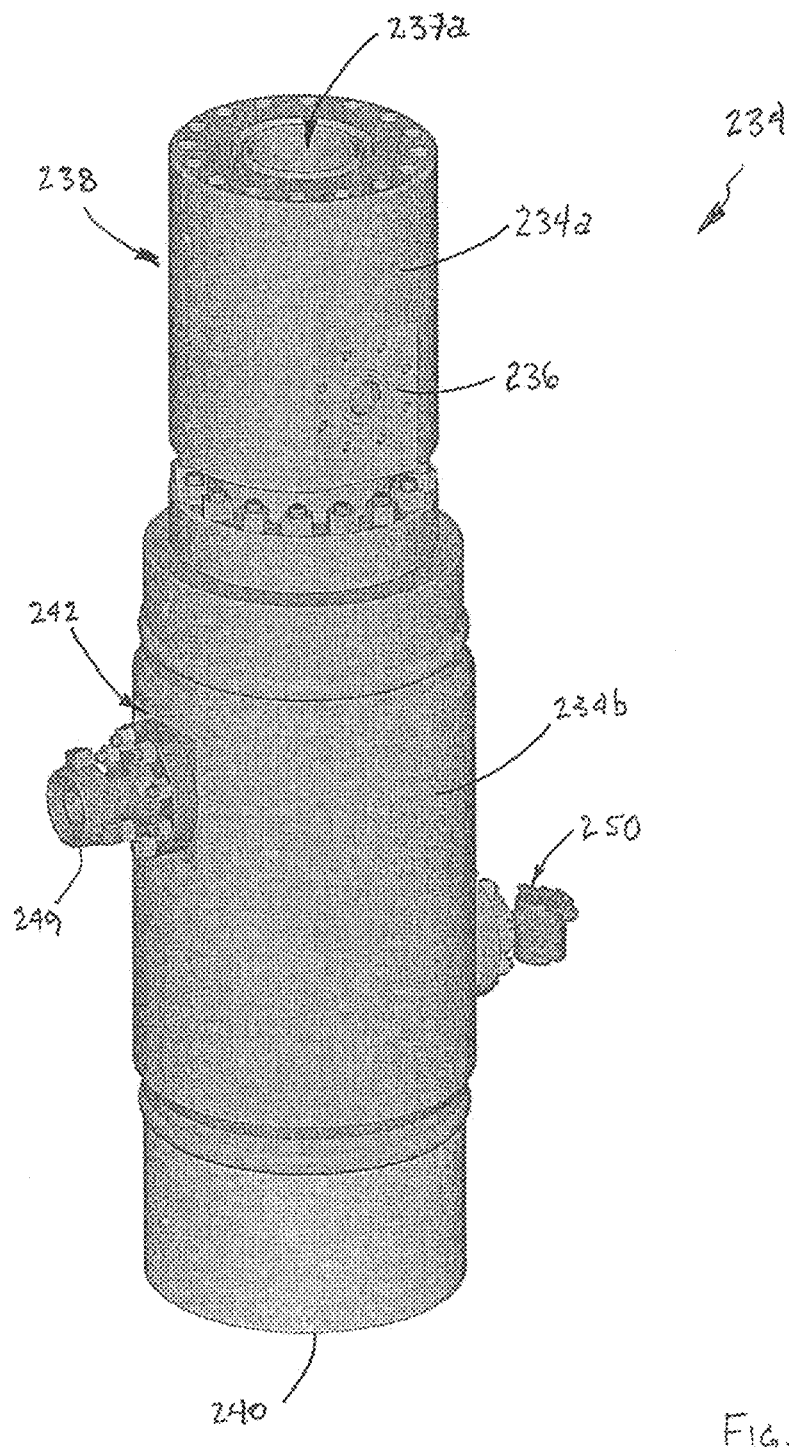
FIGS. 14 and 15 are isometric and side elevation views, respectively, of another illustrative separator vessel that may be used in the solids particle detection and handling systems shown in FIGS. 3-5 and 16-19 in accordance with other illustrative embodiments disclosed herein.
Figure 15:
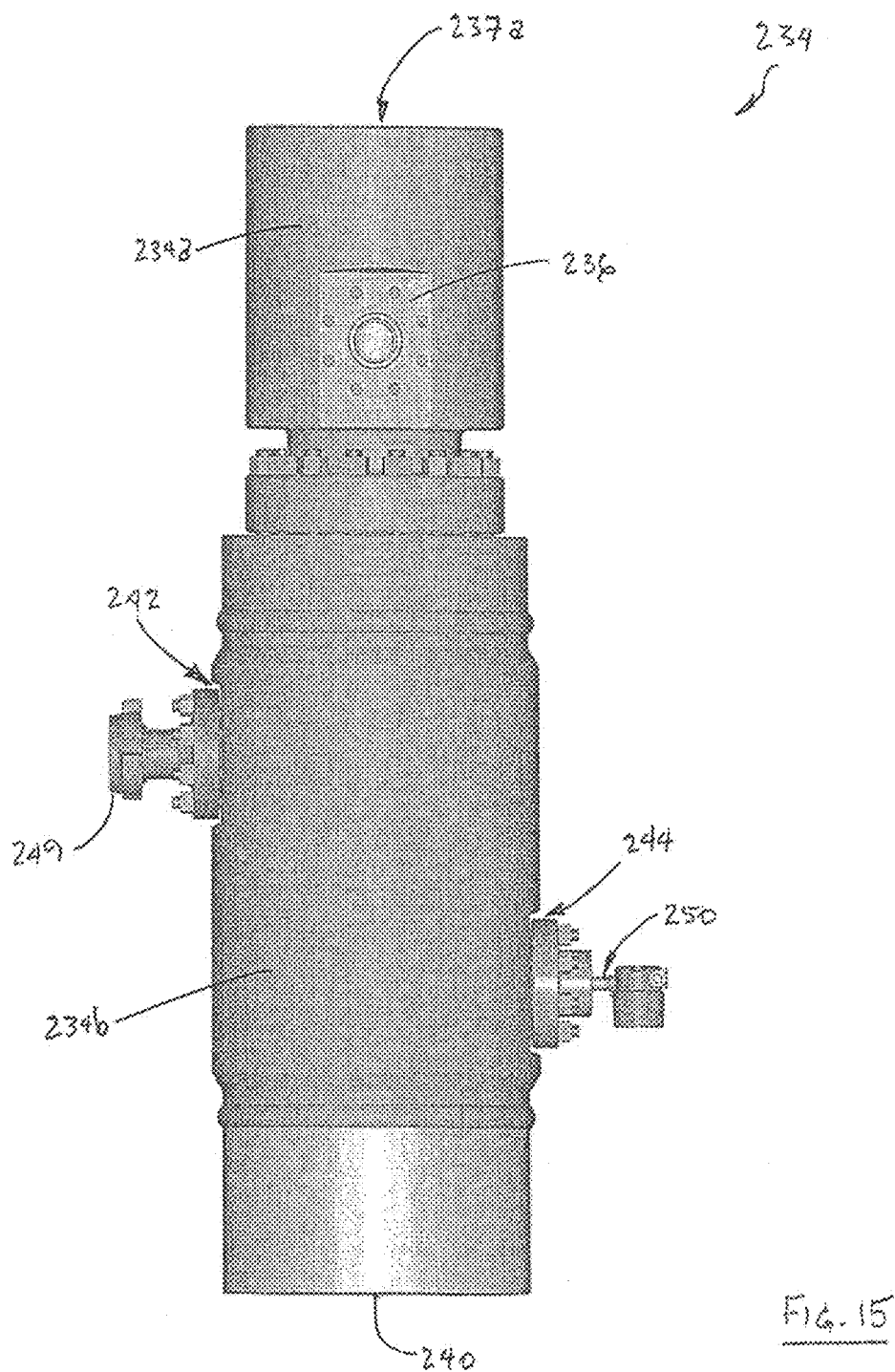
Figure 16:
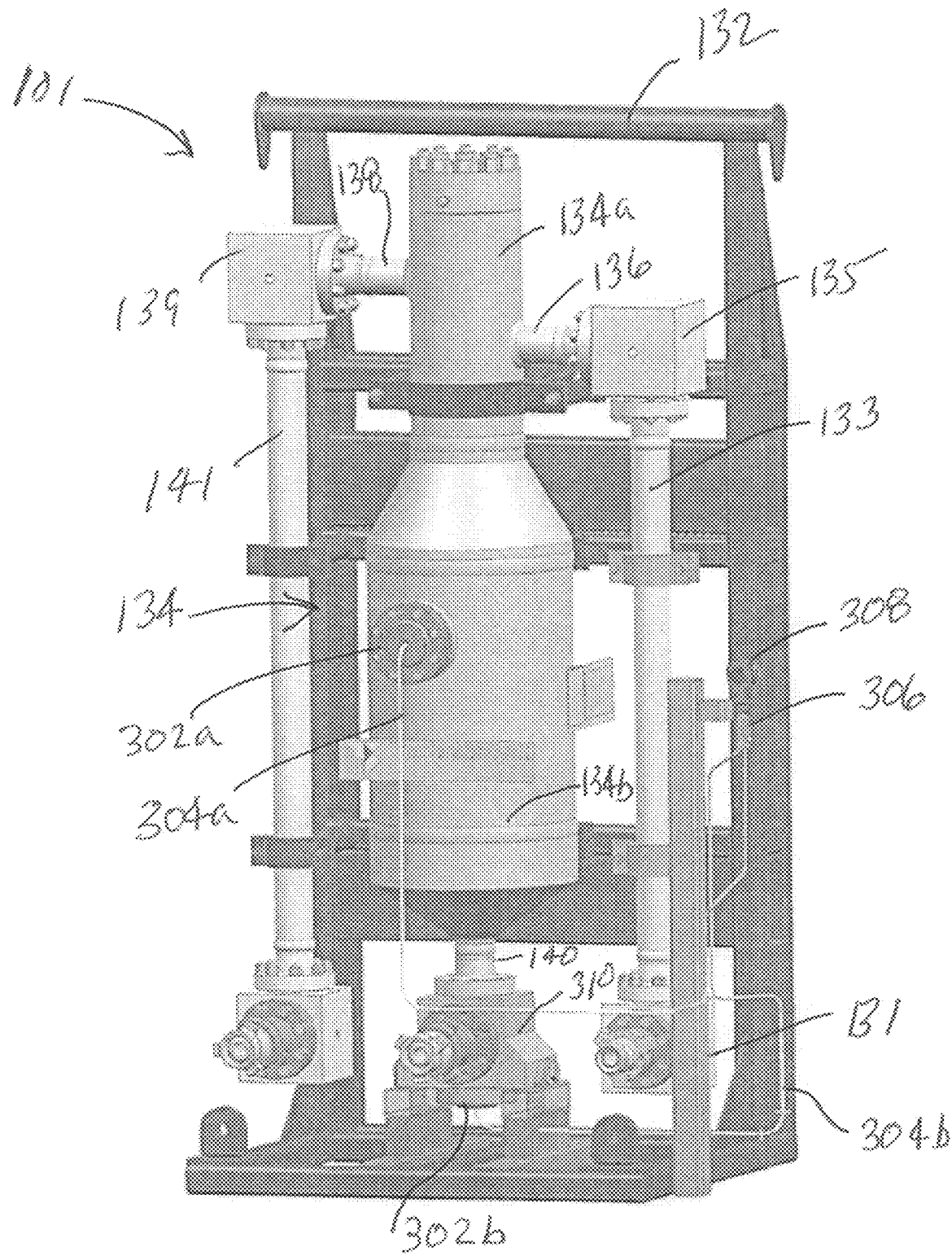
FIG. 16 is an isometric view of another illustrative separator vessel package of another exemplary solids particle detection system in accordance with some illustrative embodiments of the present disclosure.
Figure 17:
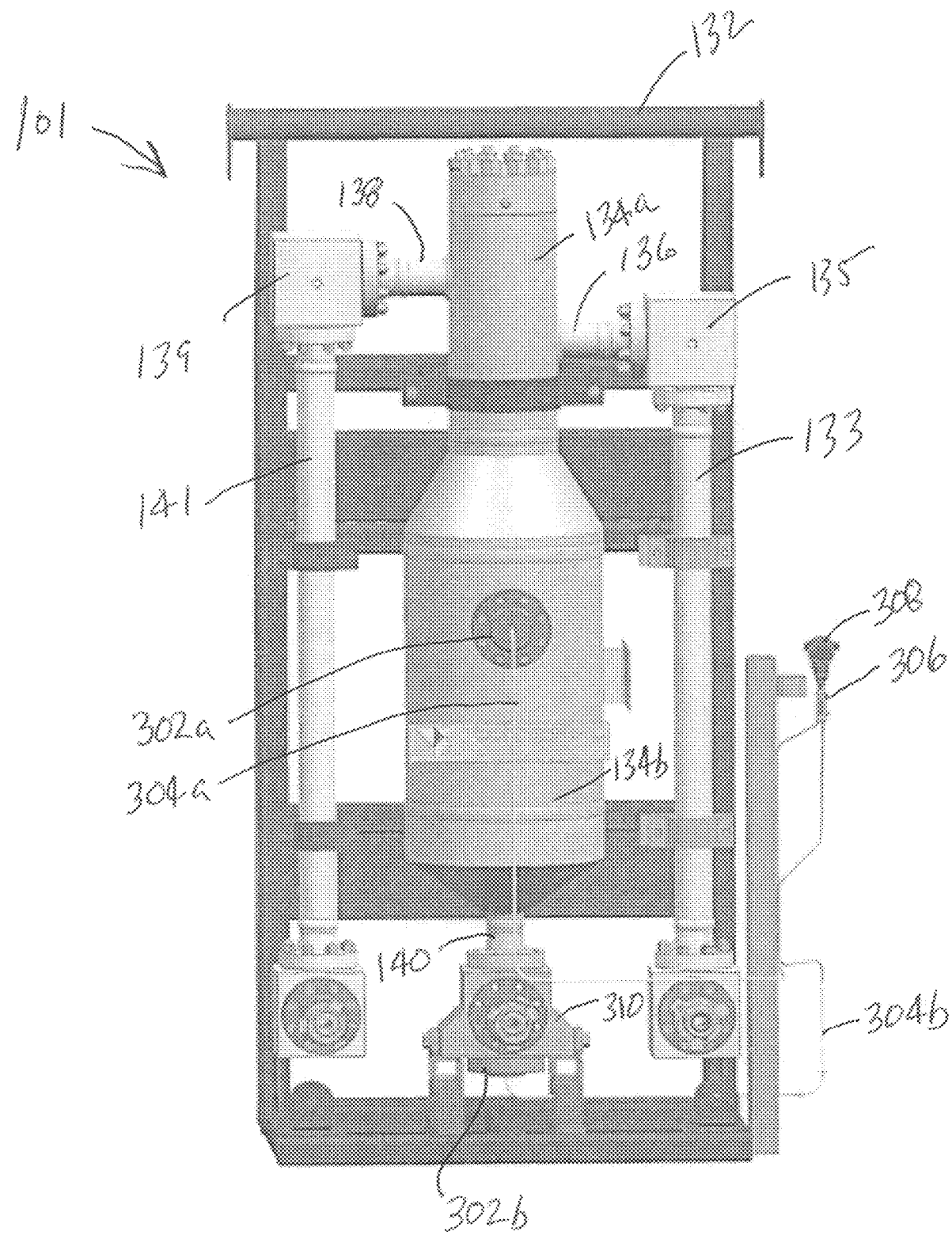
FIG. 17 is a front view of the illustrative separator vessel package shown in FIG. 16.
Figure 18:
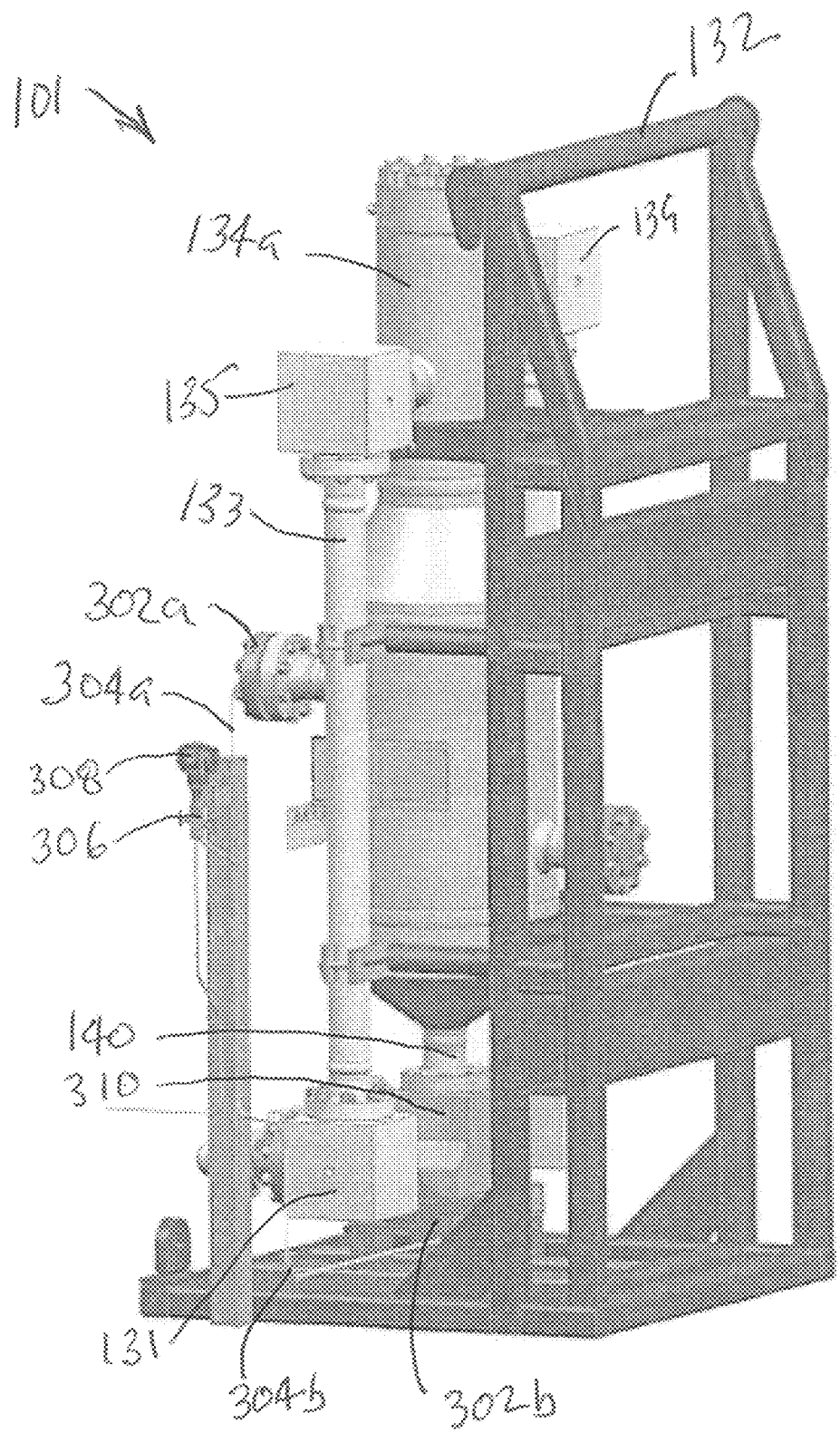
FIG. 18 is another isometric view of the illustrative separator vessel package shown in FIG. 16.

FIGS. 14 and 15 are isometric and side elevation views, respectively, of an alternative separator vessel 234 that may be used in certain exemplary embodiments of the disclosed sand detection and handling system 100 in lieu of the separator vessel 134 that is shown in FIGS. 3-5, 7 and 9-11 and described above. Rather than being in accordance with a recognized pressure vessel code, such as ASME BPVC Section VIII, the separator vessel 234 shown in FIGS. 14 and 15 may be designed and fabricated in accordance with the rules for high pressure wellhead equipment as set forth in API Specification 6A. However, while the API 6A design and fabrication rules used for the separator vessel 234 may be different from those of ASME Section VIII, the functional components remain substantially the same as those of the separator vessel 134, as will be further described below.

As with the ASME separator vessel 134, the embodiment shown in FIGS. 14 and 15 is also configured as a vertical separator vessel 234 having an upper vessel section 234a and a lower vessel section 234b. A multi-phase effluent inlet 236 and a clean water/hydrocarbon outlet 238 (not shown in FIGS. 14 and 15) are located in the upper vessel section 234a and a sand outlet 240 is located at the bottom of the lower vessel section 234b. Additionally, a flux outlet 242 and a sensor level opening 244 are positioned in the lower vessel section 234b, as well as a solids level sensor package 250 that is removably coupled to the sensor level opening 244. However, rather than the flanged nozzles used in the ASME separator vessel 134, each of the openings 236, 238, 240, 242, and 244 in the API separator vessel 234 are configured as studded outlets, wherein the bolt holes are threaded holes that are tapped into the wall of the vessel 234. As shown in FIGS. 14 and 15, a liquid evacuation package 249 is removably coupled to the flux outlet 242, the function of which is described in conjunction with the flux outlet 134 and FIG. 11 above. An access opening 237a may also be provided at the top end of the upper vessel section 234a so as to provide access to the internal components, wherein the access opening 237a may be blinded off with a bolted blind flange cover (not shown in FIGS. 14 and 15) in similar fashion to the bolted blind flange cover 137 of the ASME separator vessel 134. In general, the internal components of the separator vessel 234 are substantially identical in form and function to those of the ASME separator vessel 134, and therefore are not shown or further described here.

As a result, the subject matter disclosed herein provides detailed aspects of various new and unique systems, apparatuses, and methods that may be used for detecting and handling sand that is separated from a flow of a multi-phase fluid returned from a drilled wellbore during oil and gas well operations. Furthermore, the single level sensor used by embodiments of the disclosed system reduces overall system costs and complexity and provides the necessary robust design for use in high pressure separator vessel applications.

FIGS. 16-24 depict other illustrative embodiments of an illustrative separator vessel package of another exemplary solids particle detection system 101 in accordance with some illustrative embodiments of the present disclosure. As described more fully below, the system 100 is adapted to detect the level, volume, and/or weight of sand in a separator vessel 134 independent of the operating pressure in the separator vessel 134. As described more fully below, the system 101 can provide real time data of sand production from oil and gas wells.

In one illustrative example, the system 101 comprises a differential pressure (DP) sensing system 300 (see FIG. 20) that includes a high-pressure differential pressure (DP) sensor 306, a high-pressure differential pressure (DP) transmitter 308 and a plurality of isolation seals 302a, 302b (collectively referenced using the numeral 302). The isolation seals 302 are adapted to protect the DP sensor 306 and the DP transmitter 308 from the corrosive environment of the sand in the separator vessel 134, while still allowing the hydrostatic differential pressure measurement of the column of sand and water in the separator vessel 134 to be communicated to the DP transmitter 308. In one illustrative embodiment, the isolation seals 302a, 302b take the form of diaphragm seals. Of course, as well be appreciated by those skilled in the art after a complete reading of the present application, other forms of isolation seals may be employed with the system 101. In this particular example, the diaphragm seals 302a, 302b are operatively coupled to the DP sensor 306 by first and second liquid filled capillary tubes 304a, 304b, respectively, (collectively referenced using the numeral 304). The capillary tubes 304 may be filed with any type of liquid, e.g., water, etc. In one particular example, the components of the DP system 300 are adapted to operate in a highly erosive sand environment and cannot withstand very high design and operating pressures, e.g., design and/or operating pressures up to about 10,000 psig. In the illustrative example shown in FIG. 20, the diaphragm seals 302a, 302b are formed integral with a high-pressure flange 303 that is adapted to be removably coupled to various components of the system 101, as described more fully below. However, the present disclosure should not be considered limited to this particular illustrative example. In other applications, the isolation seals 302a, 302b may be "trapped" or "sandwiched" between two separate flanges (an embodiment not shown in the attached drawings). In one illustrative example, the DP transmitter 308 may be a high-range (10,000 psig), low-scale (−250 to +250 in $H_2O$) transmitter which allows the system 101 to withstand the high static pressure without introducing significant measurement errors. One such illustrative DP transmitter 308 is one that is available from Rosemount located in Chanhassen, Minn.

With reference to FIGS. 16-19, in one illustrative example, the isolation seal 302a may be operatively coupled to any available nozzle in the separator vessel 134 such that the DP sensor 306 can sense the pressure near the top of the column of sand and water in the separator vessel 134. The isolation seal 302b may be positioned at a location such that the DP sensor 306 can detect the pressure at or near the bottom of the column of sand and water in the separator vessel 134. Collectively, the isolation seals 302 are positioned at locations such that the DP sensor 306 can sense a differential pressure measurement of the column of sand and water—from at or near the top of the column of sand and water to at or near the bottom of the column of sand and water. The upper isolation seal 302a is positioned in the separator vessel 134 at a vertical location that is above the anticipated level of the sand within the separator vessel 134 but still within the water dominant portion of the column of sand and water in the separator vessel 134. In one particular embodiment, the lower isolation seal 134B may be positioned directly below the sand outlet 140 of the separator vessel 134. In other applications, the lower isolation seal 134B may be positioned at a location other than directly below the sand outlet 140, but positioned and configured in such a manner such that the pressure of the column of sand and water at or near the sand outlet 140 of the separator vessel 134 may be determined by the DP sensor 306.

Figure 19:
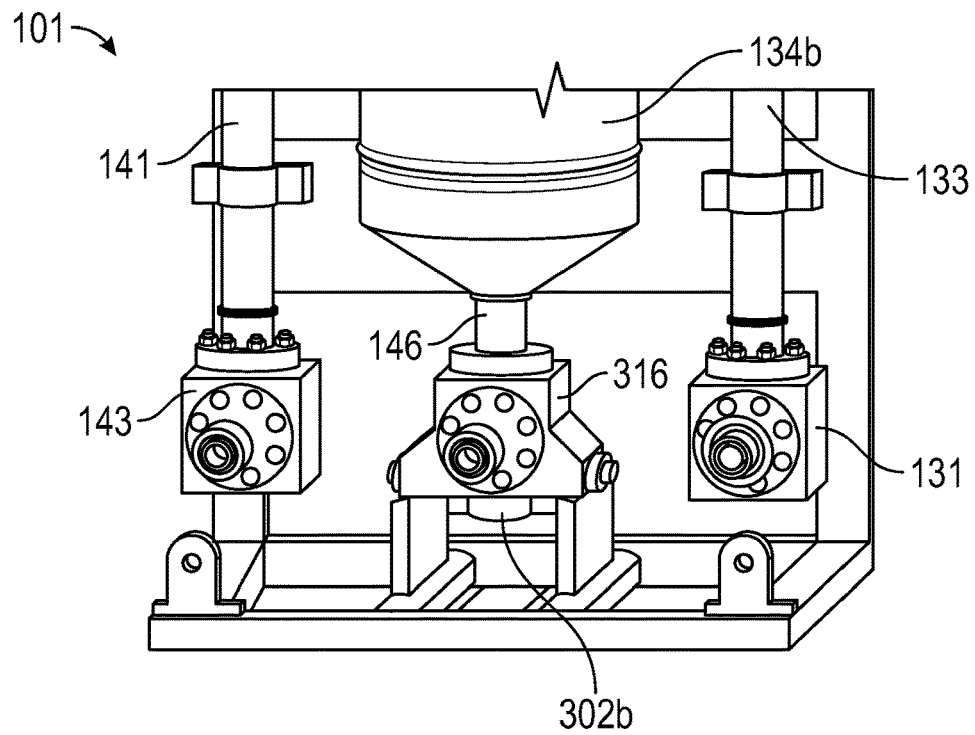
FIG. 19 is an enlarged view of the lower position of the illustrative separator vessel package shown in FIG. 16.
Figure 20:
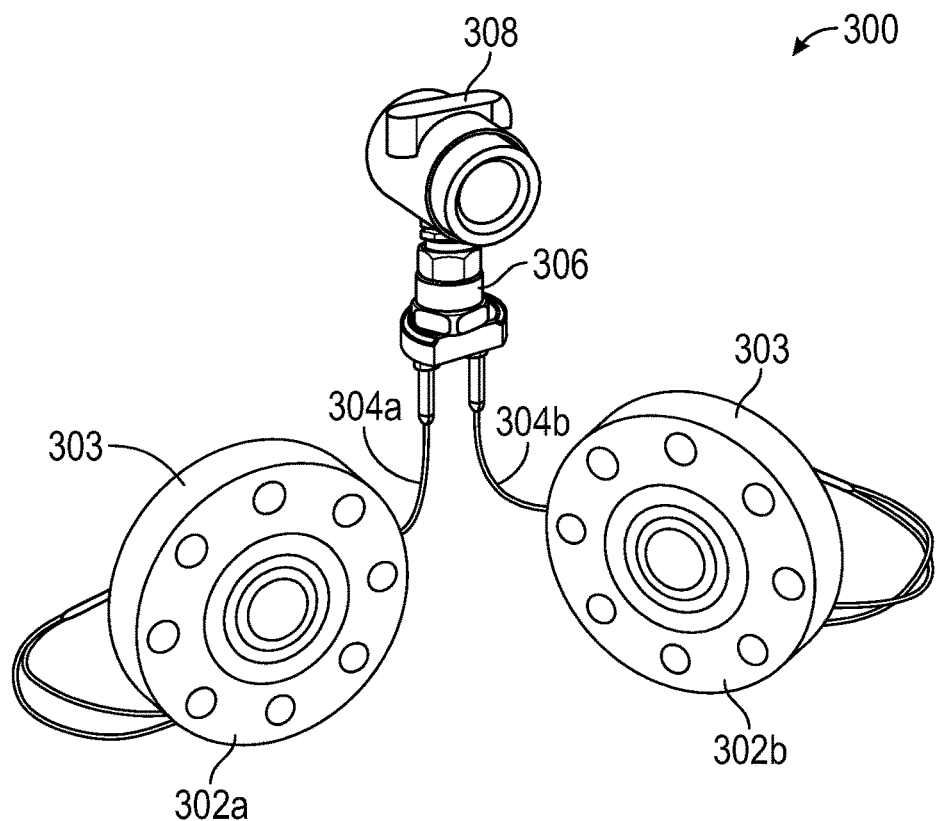
FIG. 20 depicts the basic components of one illustrative embodiment of a differential pressure sensor that may be employed with various embodiments of the solids particle detection systems disclosed herein.
Figure 21:
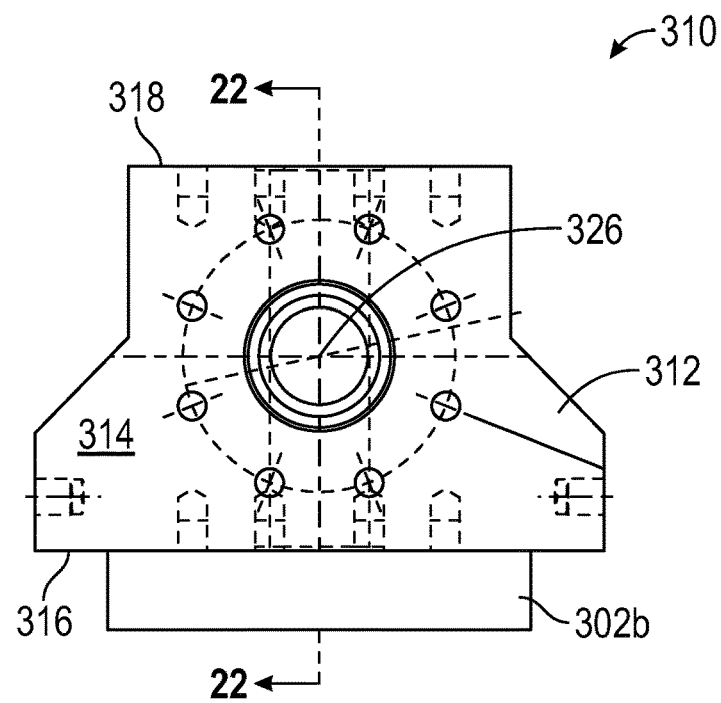
FIG. 21 is a view of a mounting block tee that may be positioned below one illustrative embodiment of a separator vessel disclosed herein.
Figure 22:
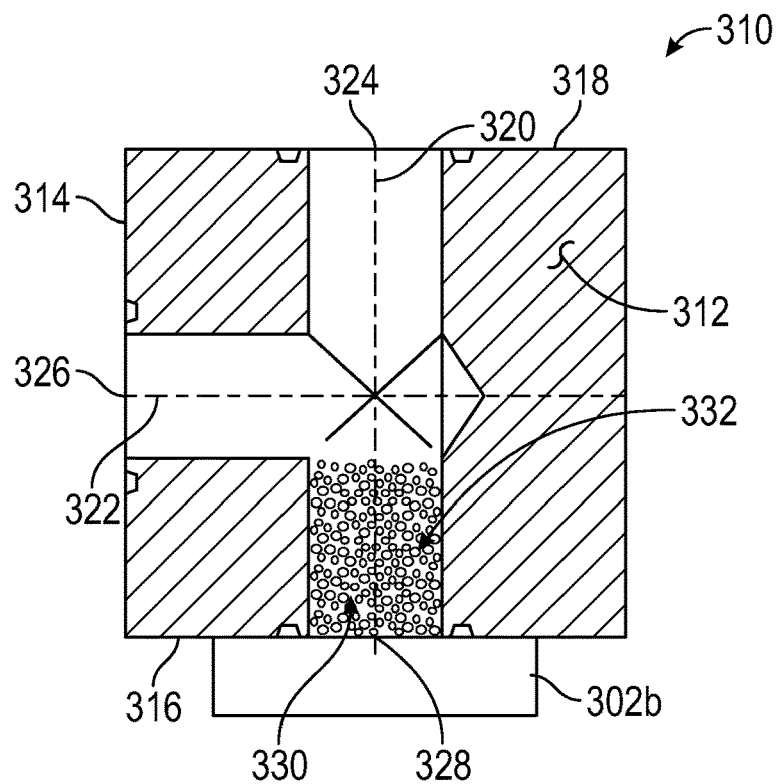
FIG. 22 is a cross-sectional view of the mounting block taken where indicated in FIG. 21.
Figure 23:
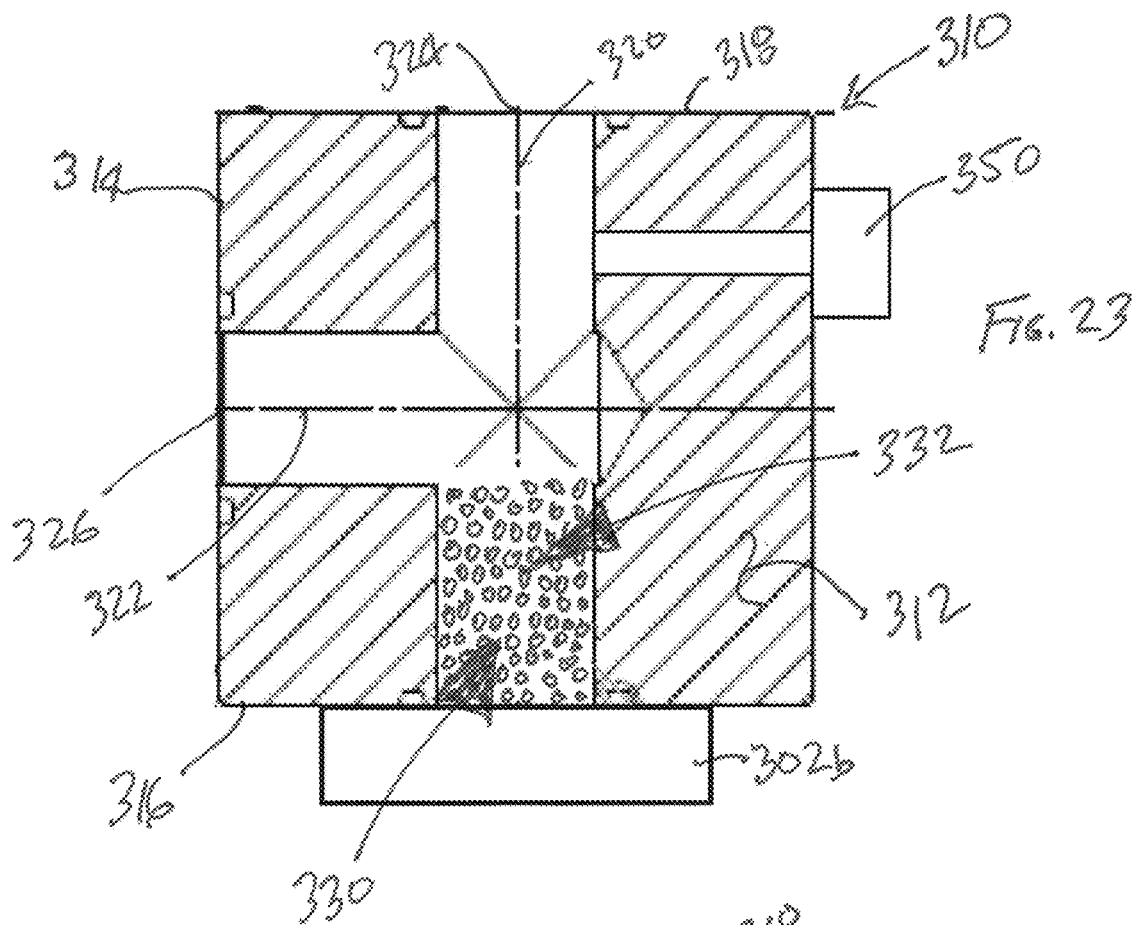
FIG. 23 a cross-sectional view of the mounting block with a temperature sensor operatively coupled thereto.
Figure 24:
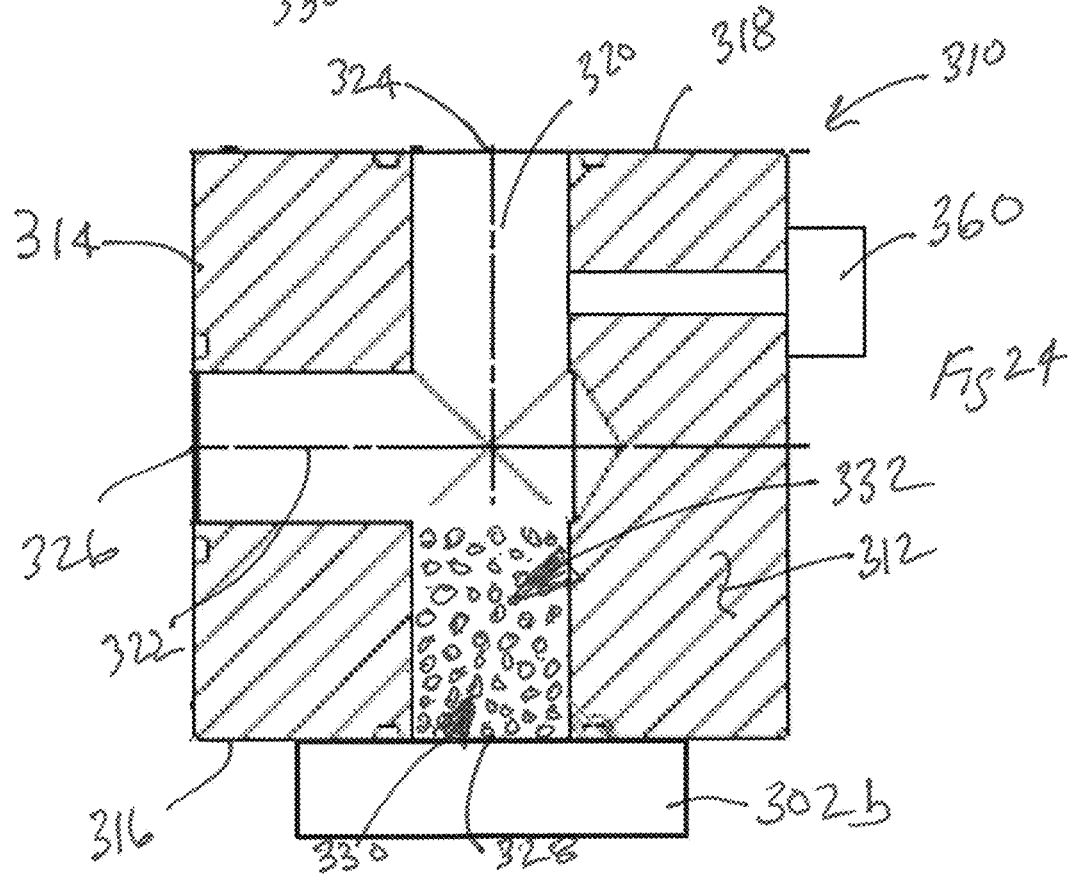
FIG. 24 a cross-sectional view of the mounting block with a microwave sensor operatively coupled thereto.

As best shown in FIGS. 19, 21 and 22, the lower isolation seal 302b is adapted to be removably coupled to a mounting block tee 310 that is coupled to the sand outlet 140 of the separator vessel 134. FIG. 21 is a side view of the mounting block tee 310 with the lower isolation seal 302b. FIG. 22 is a cross-sectional view of the mounting block tee 310 taken where indicated in FIG. 21. FIGS. 23 and 24 are cross-sectional views of the mounting block 310 taken at the same location as that of FIG. 22. No attempt has been made to show a cross-sectional view of the lower isolation seal 302b in FIG. 22, nor has any attempt been made to show the threaded fasteners that may be used to operatively couple the lower isolation seal 302b to the mounting block tee 310.

The illustrative example of the mounting block tee 310 depicted herein comprises a body 312, a front surface 314, a lower surface 316 and an upper surface 318. The mounting block tee 310 further comprises a first bore 320 through the body 312 that intersects a second bore 326 in the body 312. The mounting block tee 310 comprises a first opening 324, a second opening 326 and a third opening 328. In one particular example, the upper surface 318 is adapted to be threadingly coupled to the sand outlet 140 of the separator vessel 134. Sand from the separator vessel 134 is adapted to flow into the mounting block tee 310 through the opening 324 and out of the mounting block tee 310 via the opening 326. A portion of the bore 320 below the level of the bore 322 defines a cavity 330 above the lower isolation seal 302b. As depicted, during operation, the cavity 330 will fill with sand particles 192 to thereby provide a sand cushion 332 that acts to protect the lower isolation seal 302b from the corrosive effect of sand flowing through the mounting block tee 310.

As noted above, the system 101 is adapted to sense the differential pressure of the column of the sand and water column in the separator vessel 134 independent of the operating pressure in the separator vessel 134. Based upon that sensed differential pressure, an algorithm is then used to calculate the level, volume and/or weight of the sand in the separator vessel 134 using the known elevation difference between the isolation seals 302a, 302b, the differential pressure output from DP transmitter 308, the known volume per height strapping table of the separator vessel 134, and the calculated sand bulk density from assumptions or user inputs for water density, repose angle, sand particle density, and sand packing limit. Additionally, the algorithm may also quantify the sand production through monitoring of the sand levels within the separator vessel 134 and the quantity of sand evacuated through various valve openings of the system 101.

As will be appreciated by those skilled in the art after a complete reading of the present application, the differential pressure approach of the system 101 with respect to determining the level, volume and/or weight of the sand, may be used alone or in combination with the features of the systems 100 disclosed in FIGS. 3-15 above, including, for example, the solids level sensor packages 150 discussed above. For example, in some applications, the DP sensor 306 may provide more accurate data when the column of sand and water in the separator vessel 134 is primarily a column of sand that is suspended in the water. On the other hand, when the column of sand and water in the separator vessel 134 comprises a significant amount of settled sand, the accuracy of the data from the DP sensor 306 may be adversely impacted. To address this issue, the system 101 may also include one or more level and/or viscosity sensors (as described above) in addition to the DP sensor 306. Such level sensors may provide more accurate data when the column of sand and water in the separator vessel 134 comprises a significant amount of settled sand. On the other hand, when the column of sand and water in the separator vessel 134 is primarily a column of sand that is suspended in the water, the accuracy of the data from the level sensors may be adversely impacted. Thus, a system 101 that includes both the DP sensor 306 and the level sensors may be beneficial and provide useful data over a wider range of operating conditions.

As will be appreciated by those skilled in the art after a complete reading of the present application, the systems and methods disclosed herein should not be considered to be limited to the specific examples depicted herein. For example, in some applications (not shown), the DP transmitter 308 may be directly coupled to the upper isolation seal 302a, thereby eliminating the need for the capillary tube 304a. As noted above. It may also be possible to mount the lower isolation seal 302b at a location other than directly below the sand outlet 304. For example, it may be possible to mount the lower isolation seal 302b near the bottom of the separator vessel 134 such that it is positioned at an angle relative to a vertical centerline of the separator vessel 134, with angular compensation calculations being made in the algorithm. In other applications, an off-the-shelf differential pressure sensor may be replaced with individual pressure sensors wherein the data from each of the individual pressure sensors is transmitted to the control system package 160 where the differential pressure is calculated by the components of the control system package 160.

FIG. 23 is a cross-sectional view of the mounting block 310 with a simplistically depicted temperature sensor 350 operatively coupled thereto. The structure, function and operation of such temperature sensors 350 are well known to those skilled in the art. In the depicted example, the temperature sensor 350 is adapted to sense the temperature of fluid and/or sand in the bore 320. In general, a higher concentration of sand in the bore will lead to a lower temperature of the combined sand/fluid in the bore 320. Thus, the temperature of the fluid/sand mixture may be used to take various control actions, e.g., empty sand from the vessel. Of course, as will be appreciated by those skilled in the art after a complete reading of the present application, the temperature sensor 350 may be used in conjunction with, or in lieu of, any of the other types of sensors disclosed in this application, e.g., the pressure sensors, level sensors, etc., Moreover, although the temperature sensor 350 is depicted as being positioned in the mounting block 310, in other applications, the temperature sensor 350 may be positioned at other locations within the system.

FIG. 24 is a cross-sectional view of the mounting block 310 with a simplistically depicted microwave sensor 360 operatively coupled thereto. The structure, function and operation of such microwave sensors 360 are well known to those skilled in the art. In the depicted example, the microwave sensor 360 is adapted to sense the dielectric constant (k) of fluid and/or sand in the bore 320. In general, the higher concentration of sand in the bore, the lower will be the dielectric constant of the combined sand/fluid in the bore 320. Thus, the dielectric constant of the fluid/sand mixture may be used to take various control actions, e.g., empty sand from the vessel. Of course, as will be appreciated by those skilled in the art after a complete reading of the present application, the microwave sensor 360 may be used in conjunction with, or in lieu of, any of the other types of sensors disclosed in this application, e.g., the pressure sensors, level sensors, the temperature sensors, etc. Moreover, although the microwave sensor 360 is depicted as being positioned in the mounting block 310, in other applications, the microwave sensor 360 may be positioned at other locations within the system.

The particular embodiments disclosed above are illustrative only, as the subject matter defined by the appended claims may be modified and practiced in different but equivalent manners apparent to those skilled in the art having the benefit of the teachings herein. For example, some or all of the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the claimed subject matter. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A system, comprising:
   a separator vessel that is adapted to separate solids particles from a flow of a multi-phase fluid;
   a differential pressure sensing system, the differential sensing pressure system being adapted to measure a differential pressure of a column of the multi-phase fluid in the separator vessel, wherein the differential pressure sensing system comprises first and second isolation seals,
   wherein the separator vessel further comprises a sand outlet, and
   wherein the first isolation seal is coupled to a side of the separator vessel and the second isolation seal is positioned vertically below the sand outlet; and
   a control system that is adapted to determine at least one of a level, volume or weight of the separated solids particles within the separator vessel based upon at least the measured differential pressure of the column of the multi-phase fluid in the separator vessel.

2. The system of claim 1, wherein the first isolation seal comprises a first diaphragm seal and wherein the second isolation seal comprises a second diaphragm seal, respectively.

3. The system of claim 1, wherein the differential pressure system further comprises a differential pressure sensor and a differential pressure transmitter, the differential pressure transmitter being adapted to transmit the measured differential pressure of the column of the multi-phase fluid to the control system.

4. The system of claim 2, wherein the differential pressure system further comprises a differential pressure sensor, a differential pressure transmitter, a first liquid filled capillary tube that is operatively coupled to the differential pressure sensor and the first diaphragm seal and a second liquid filled capillary tube that is operatively coupled to the differential pressure sensor and the second diaphragm seal.

5. The system of claim 1, wherein the first isolation seal is coupled to a nozzle positioned in the side of the separator vessel, wherein the first isolation seal is positioned at a first vertical height level relative to ground, the second isolation seal is positioned at a second vertical height level above ground wherein the first vertical height level is greater than the second vertical height level.

6. The system of claim 1, wherein the system further comprises a mounting block tee, wherein the mounting block tee is removably coupled to the sand outlet and the second isolation seal is removably coupled to the mounting block tee.

7. The system of claim 6, further comprising a bore extending through the mounting block tee, wherein a portion of the bore defines a cavity located above the second isolation seal.

8. The system of claim 1, further comprising a level sensor, the level sensor comprising a viscosity sensor that is adapted to measure changes in the viscosity of a fluid mixture that comprises the solids particles separated from the flow of multi-phase fluid by the separator vessel.

9. The system of claim 8, wherein the level sensor is a single level sensor that is positioned inside of the separator vessel at a pre-determined maximum level of separated solids particles.

10. The system of claim 1, wherein the solids particles comprise sand.

11. The system of claim 1, further comprising a sand outlet control valve.

12. The system of claim 11, wherein the control system is adapted to open the sand outlet control valve to discharge the separated solids particles from the separator vessel when the determined level of separated solids particles is at a pre-determined maximum level of separated solids particles.

13. The system of claim 11, wherein the control system is adapted to determine the amount of solids particles discharged from the separator vessel after the sand outlet control valve is opened.

14. The system of claim 8, wherein the level sensor further comprises a density sensor that is adapted to measure changes in the density of the fluid mixture.

15. The system of claim 14, wherein the control system is further adapted to determine the level of the separated solids particles from the changes in the density of the fluid mixture measured by the density sensor.

16. The system of claim 8, wherein the level sensor further comprises a second sensor that is adapted to measure changes in the damping factor of the fluid mixture.

17. The system of claim 16, wherein the control system is further adapted to determine the level of the separated solids particles from the changes in the damping factor of the fluid mixture measured by the second sensor.

18. The system of claim 1, further comprising a temperature sensor that is adapted to measure the temperature of the multi-phase fluid.

19. The system of claim 6, further comprising a temperature sensor that is adapted to measure the temperature of the multi-phase fluid wherein the temperature sensor is operatively coupled to the mounting block tee.

20. The system of claim 1, further comprising a microwave sensor that is adapted to measure the dielectric constant of the multi-phase fluid.

21. The system of claim 6, further comprising a microwave sensor that is adapted to measure the dielectric constant of the multi-phase fluid wherein the microwave sensor is operatively coupled to the mounting block tee.

* * * * *